(12) United States Patent
Shirai

(10) Patent No.: US 11,711,463 B2
(45) Date of Patent: Jul. 25, 2023

(54) TELEPHONE ADVERTISEMENT SYSTEM, TELEPHONE ADVERTISEMENT METHOD, AND COMPUTER READABLE MEDIUM STORING TELEPHONE ADVERTISEMENT PROGRAM

(71) Applicant: RAKUTEN GROUP, INC., Tokyo (JP)

(72) Inventor: Saki Shirai, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 65 days.

(21) Appl. No.: 17/381,728

(22) Filed: Jul. 21, 2021

(65) Prior Publication Data

US 2022/0131971 A1  Apr. 28, 2022

(30) Foreign Application Priority Data

Oct. 27, 2020  (JP) .............................. JP2020-179915

(51) Int. Cl.
*H04M 3/42* (2006.01)
*H04M 3/487* (2006.01)

(52) U.S. Cl.
CPC ... *H04M 3/42068* (2013.01); *H04M 3/42076* (2013.01); *H04M 3/4878* (2013.01)

(58) Field of Classification Search
CPC ........... H04M 3/42059; H04M 3/4878; H04M 3/42076; H04M 3/42068
USPC ........................................................ 455/415
See application file for complete search history.

(56) References Cited

U.S. PATENT DOCUMENTS

| 9,767,473 | B2 * | 9/2017 | Dube ..................... G06Q 30/02 |
| 2003/0063721 | A1 | 4/2003 | Hirose |
| 2007/0269031 | A1 * | 11/2007 | Honig ................. H04M 3/5238 379/142.01 |
| 2008/0091518 | A1 | 4/2008 | Eisenson et al. |

(Continued)

FOREIGN PATENT DOCUMENTS

| JP | 2003-110705 A | 4/2003 |
| JP | 3821752 B2 | 9/2006 |

(Continued)

OTHER PUBLICATIONS

"Digital Audio Ads come to DoubleClick", https://www.blog.google/products/marketingplatform/360/digital*audio*ads*come*doubleckick/, pp. 1-5, May 30, 2018.

*Primary Examiner* — Jirapon Tulop
(74) *Attorney, Agent, or Firm* — Sughrue Mion, PLLC

(57) ABSTRACT

A telephone advertisement system acquires, in response to receiving a telephone talk request from a caller to a callee, callee information indicating a callee from a caller terminal device of the caller. The telephone advertisement system acquires, based on the acquired callee information, advertisement content associated with a condition corresponding to an attribute of the callee among a plurality of pieces of advertisement content, each of the plurality of piece of advertisement content associated with a condition of a person to whom respective advertisement content is presented, the condition of the person stored in a predetermined storage. The telephone advertisement system transmits the acquired advertisement content to the caller terminal device to cause the caller terminal device to present the advertisement content within an invitation period during which the callee is being invited to answer an incoming call.

13 Claims, 23 Drawing Sheets

(56) References Cited

U.S. PATENT DOCUMENTS

| | | | |
|---|---|---|---|
| 2013/0063721 A1 | 3/2013 | Fujii et al. | |
| 2014/0147099 A1 | 5/2014 | Chase | |
| 2014/0161412 A1 | 6/2014 | Chase et al. | |
| 2014/0207587 A1* | 7/2014 | Strietzel | G06Q 30/0269 705/14.73 |
| 2020/0245048 A1 | 7/2020 | Chase et al. | |
| 2021/0352379 A1* | 11/2021 | Black | H04N 21/42203 |

FOREIGN PATENT DOCUMENTS

| | | |
|---|---|---|
| JP | 2007-121694 A | 5/2007 |
| JP | 2009-213100 A | 9/2009 |
| JP | 3160093 U | 6/2010 |
| JP | 2010-251884 A | 11/2010 |
| JP | 2011-114677 A | 6/2011 |
| JP | 5161092 B2 | 3/2013 |
| JP | 2012-182511 A | 5/2018 |
| JP | 6622588 B2 | 12/2019 |
| WO | 2017/054708 A1 | 4/2017 |

* cited by examiner

FIG. 4

| IDENTIFICATION INFORMATION DB | 24a |
|---|---|
| TERMINAL ID | |
| USER ID | |

FIG.6

| MEMBER ATTRIBUTE DB | 34a |
|---|---|
| USER ID | |
| TELEPHONE NUMBER | |
| USER ATTRIBUTE INFORMATION | |
| ⋮ | |

| ADVERTISEMENT DB | 34b |
|---|---|
| ADVERTISER ID | |
| ADVERTISEMENT ID | |
| ADVERTISEMENT CONTENT | |
| ADVERTISEMENT COST | |
| LINKED URL | |
| TARGET CONDITION INFORMATION | |
| ⋮ | |

FIG.18

```
   INVITATION TIME HISTORY DB      14a
   ┌─────────────────────────────┐
   │      CALLEE TERMINAL ID     │
   │  INCOMING CALL DATE AND TIME│
   │        INVITATION TIME      │
   └─────────────────────────────┘

INVITATION TIME TENDENCY DB     14b
   ┌─────────────────────────────────┐
   │        CALLEE TERMINAL ID       │
   │ INVITATION TIME TENDENCY INFORMATION │
   └─────────────────────────────────┘
```

FIG.19
INVITATION TIME OF 20 SECONDS OR MORE
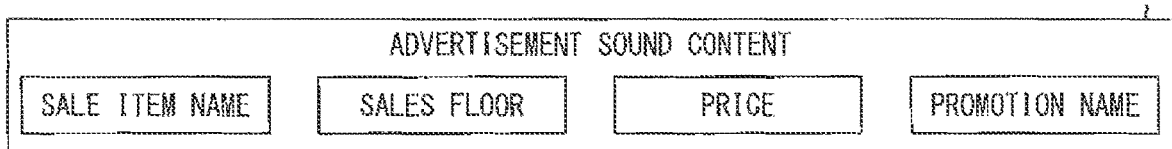
20 SECONDS
INVITATION TIME OF 14 TO 20 SECONDS
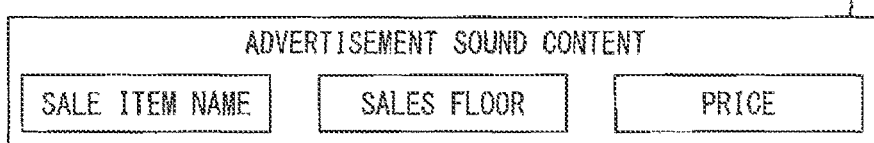
14 SECONDS
INVITATION TIME OF 8 TO 14 SECONDS
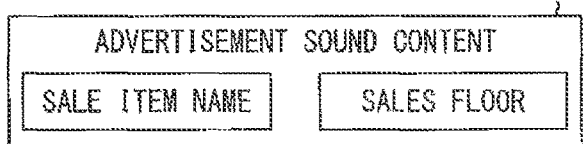
8 SECONDS
INVITATION TIME OF LESS THAN 8 SECONDS
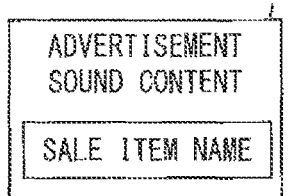
5 SECONDS

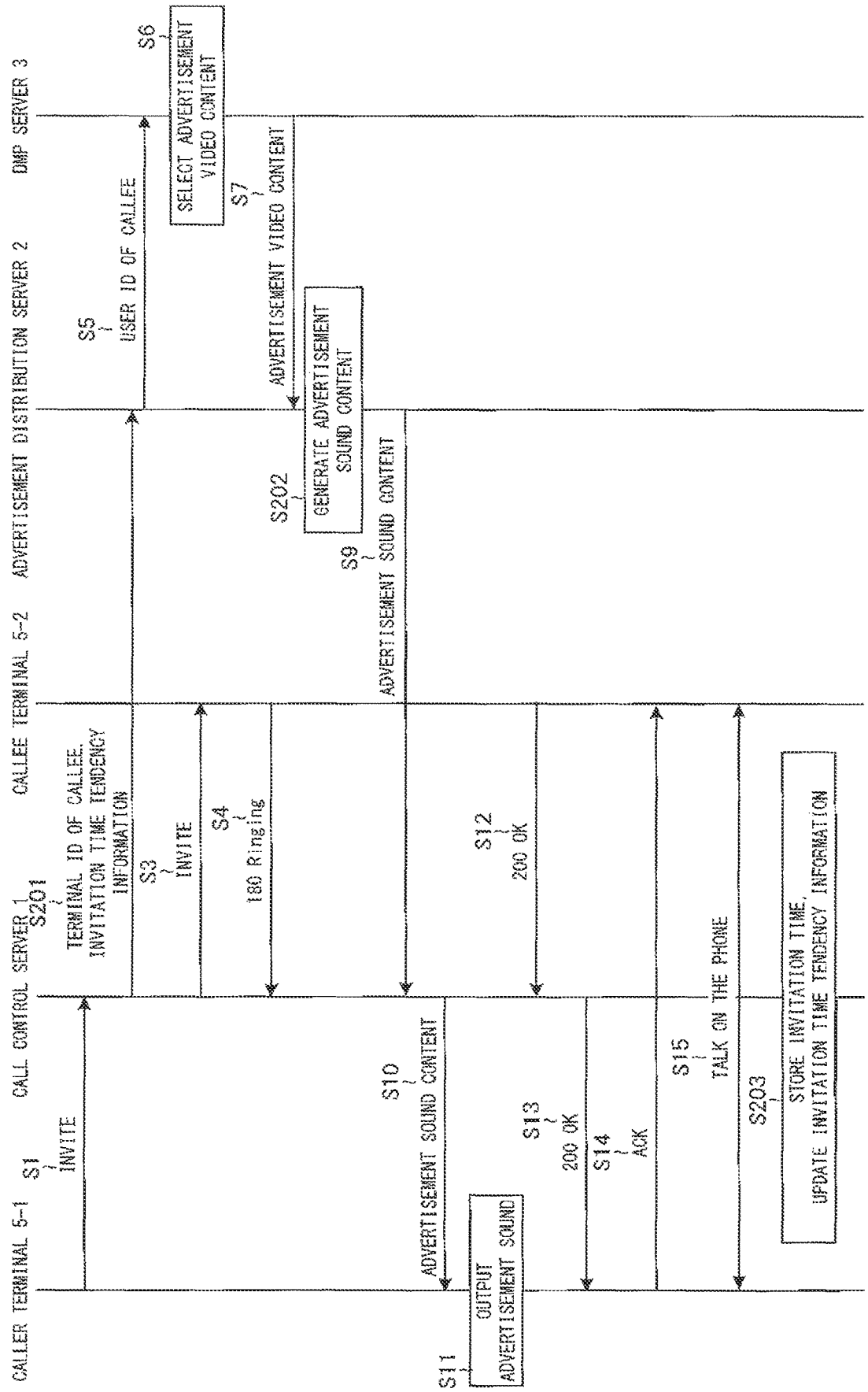

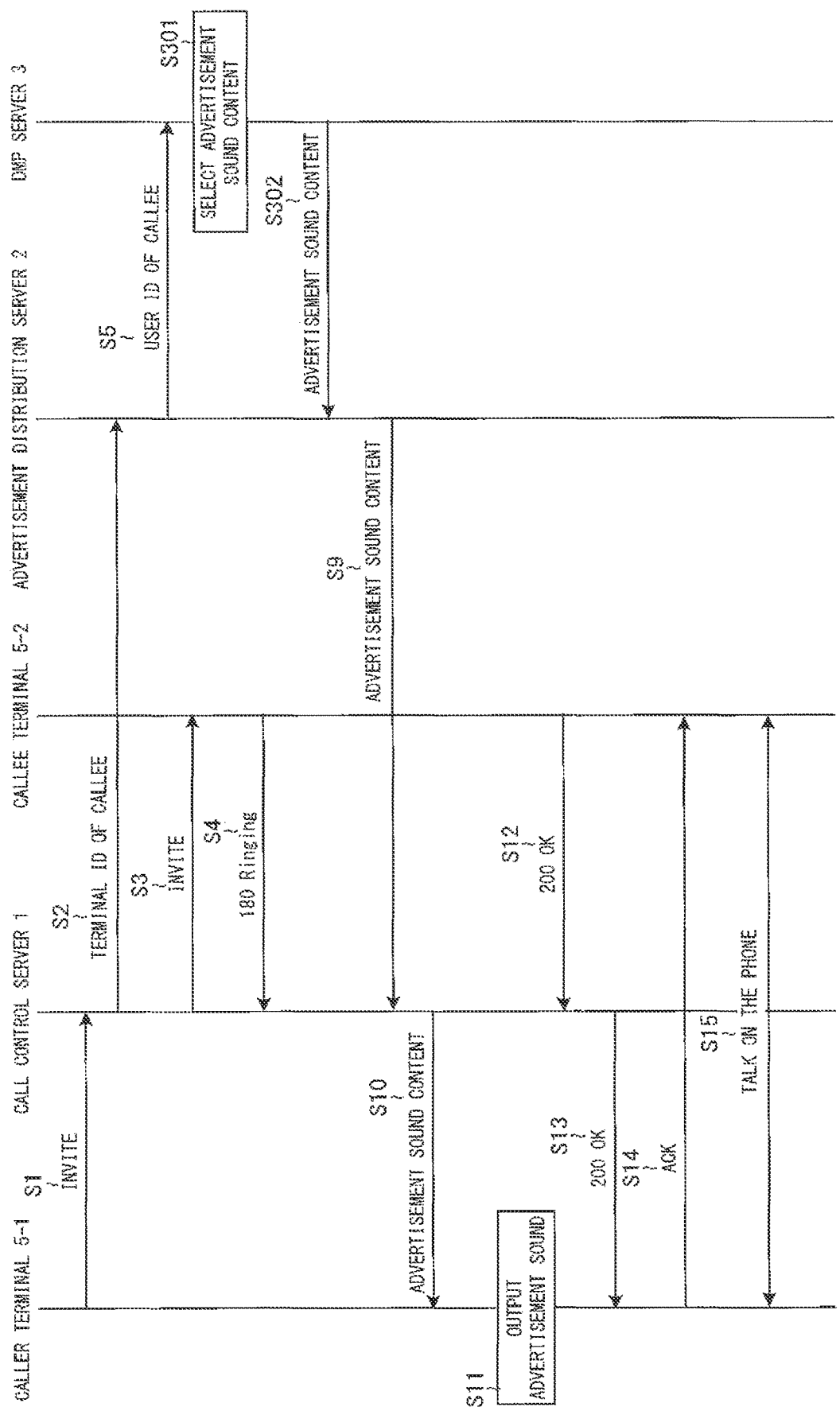

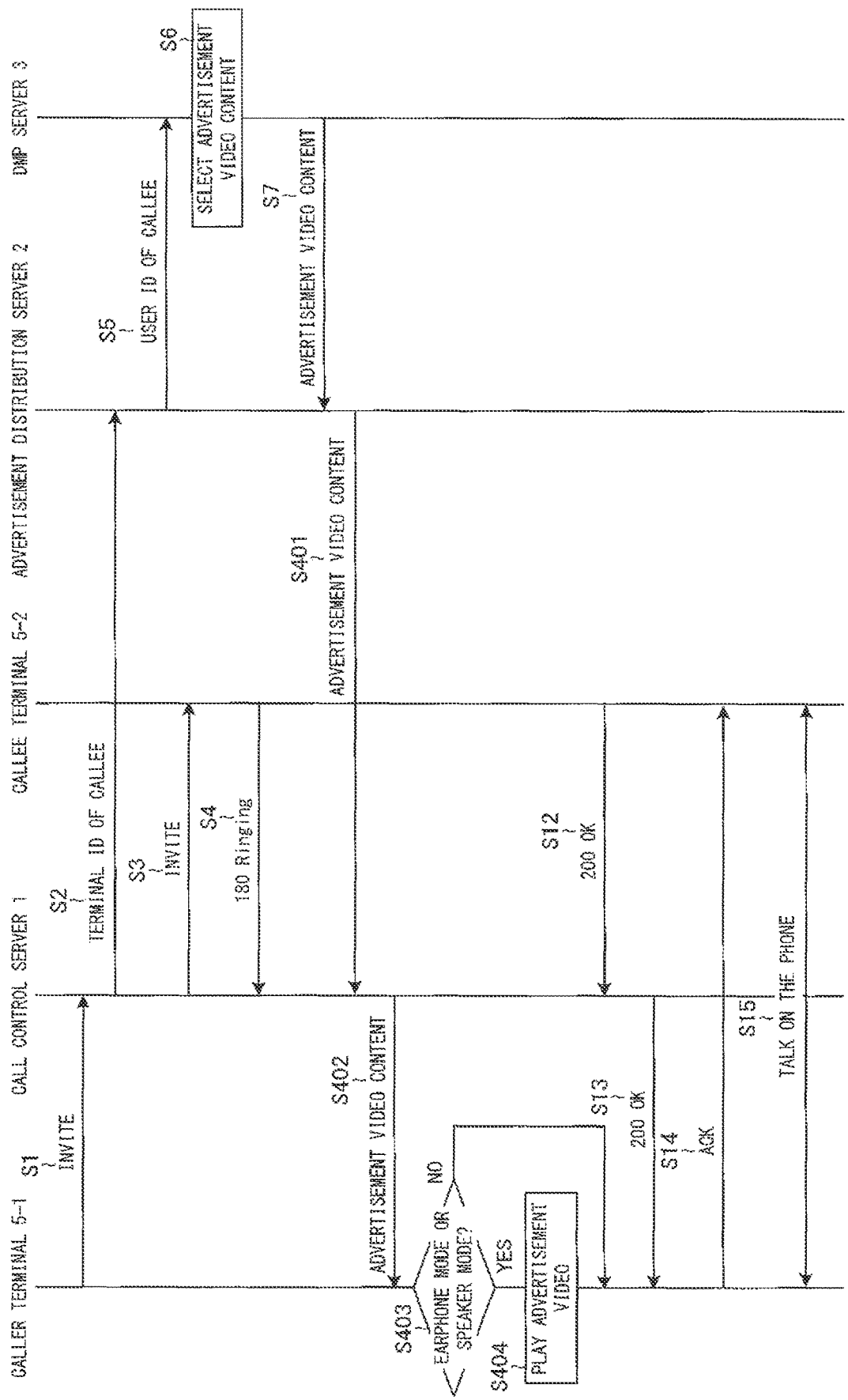

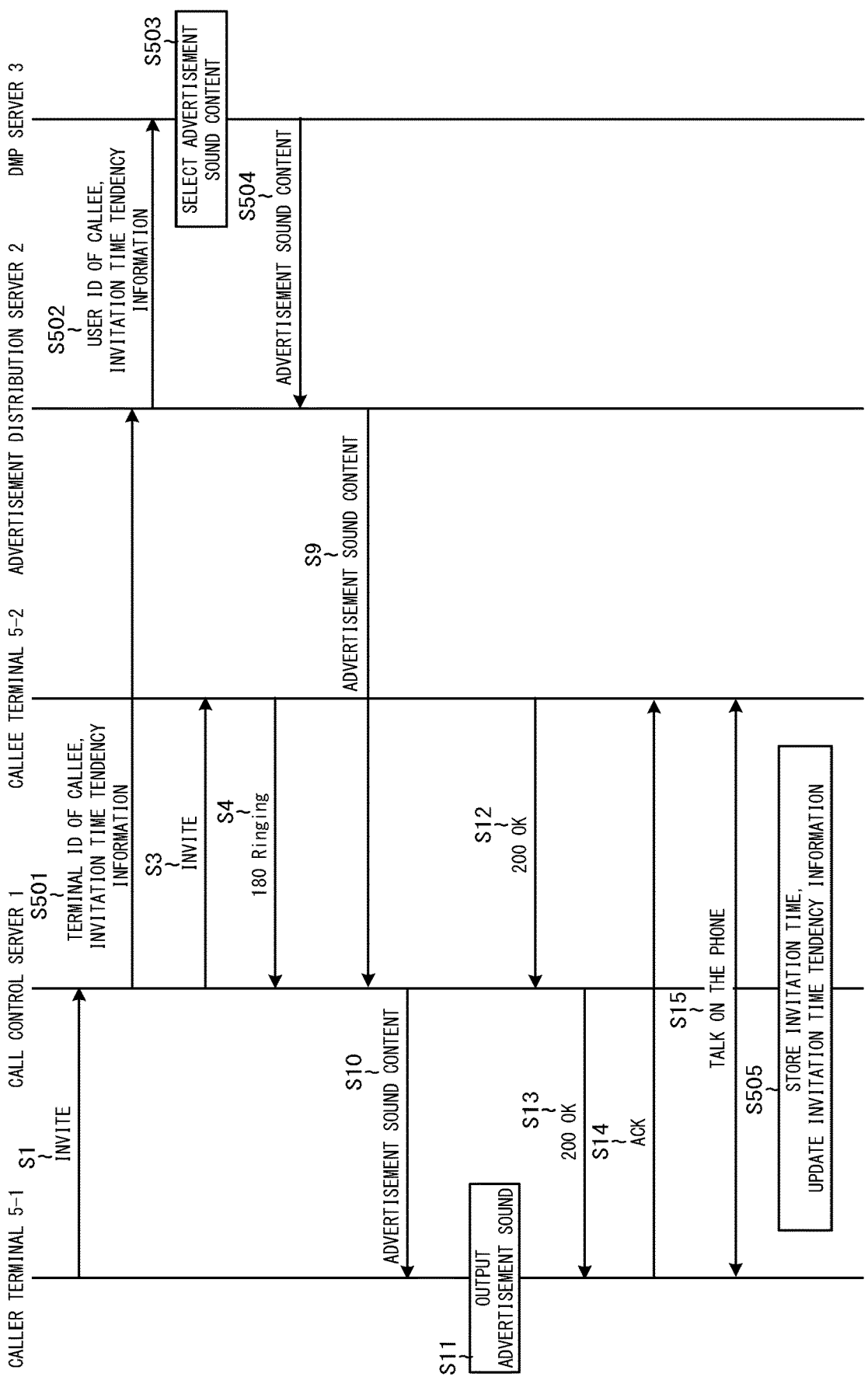

TELEPHONE ADVERTISEMENT SYSTEM, TELEPHONE ADVERTISEMENT METHOD, AND COMPUTER READABLE MEDIUM STORING TELEPHONE ADVERTISEMENT PROGRAM

CROSS-REFERENCE TO RELATED PATENT APPLICATION

This application claims priority from Japanese Patent Application No. 2020-179915 filed Oct. 27, 2020, the entire disclosure of which, including the specification, the scope of claims, drawings, and abstract, is incorporated herein by reference in their entirety.

BACKGROUND

Technical Field

The present invention relates to a technical field of a method of presenting an advertisement to a user when the user makes a phone call.

Related Art

At present, Internet advertising that distribute advertisements via networks are becoming popular. In such an advertisement system, targeting is performed in order to raise an overall conversion rate and a click-through rate. For example, for each advertisement, an advertiser sets a condition of an attribute of a target segment. For example, when the user displays a web page or plays content back, an advertisement for which a target condition corresponding to the attribute of the user is set is displayed. For example, JP 5161092 discloses that an advertisement is displayed only to users in a certain location (paragraph [0016]).

Furthermore, as another example of the Internet advertising, a technology has been proposed in which, when a user makes a call, the user is made to hear a sound of the advertisement. For example, JP 2009-213100 A discloses a technology for allowing a calling party to listen to an advertisement using sounds or music simultaneously with ring-back tones heard from a telephone of a called party, when the calling party makes a phone call.

SUMMARY

It is considered effective to use targeting for selecting an advertisement to be distributed to a user when the user makes a call. For example, as described above, selection of an advertisement using targeting is performed based on the attribute of the user to whom the advertisement is distributed. For example, information of an attribute of the user is provided by the user himself/herself, or the attribute of the user is identified based on a history of behavior of the user, information indicating the user's situation, or the like. However, there is a possibility that the user has an attribute other than the attributes that can be identified from the user's own behavior and the like. By identifying such a potential attribute that the user may not notice by himself/herself and presenting an advertisement corresponding to the attribute, it is expected that the effect of the advertisement is enhanced.

The present invention has been made in view of the above points, and an example of an object is to provide a telephone advertisement system, a telephone advertisement method, and a computer readable medium storing a telephone advertisement program that can present an advertisement corresponding to an attribute of a user, which has been difficult to identify so far, at the time of inviting a callee to answer an incoming call in a situation where the user attempts to make the call.

An aspect of the present invention is a telephone advertisement system comprising: at least one memory configured to store thereon computer program code; and at least one processor configured to access the at least one memory and operate according to the computer program code, the computer program code comprising: an information acquisition code configured to cause at least one of the at least one processor to acquire, in response to receiving a telephone talk request from a caller to a callee, callee information indicating a callee from a caller terminal device of the caller; an advertisement content acquisition code configured to cause at least one of the at least one processor to acquire, based on the acquired callee information, advertisement content associated with a condition corresponding to an attribute of the callee among a plurality of pieces of advertisement content, each of the plurality of pieces of advertisement content being associated with a condition of a person to whom respective advertisement content is presented, the condition of the person being stored in a predetermined storage; and a transmission code configured to cause at least one of the at least one processor to transmit the acquired advertisement content to the caller terminal device and thereby cause the caller terminal device to present the advertisement content within an invitation period during which the callee is being invited to answer an incoming call.

Another aspect of the present invention is a telephone advertisement method performable by a computer, the method comprising: acquiring, in response to receiving a telephone talk request from a caller to a callee, callee information indicating a callee from a caller terminal device of the caller; acquiring, based on the acquired callee information, advertisement content associated with a condition corresponding to an attribute of the callee among a plurality of pieces of advertisement content, each of the plurality of pieces of advertisement content being associated with a condition of a person to whom respective advertisement content is presented, the condition of the person being stored in a predetermined storage; and transmitting the acquired advertisement content to the caller terminal device and thereby cause the caller terminal device to present the advertisement content within an invitation period during which the callee is being invited to answer an incoming call.

Yet another aspect of the present invention is a non-transitory computer readable medium storing thereon a telephone advertisement program, the telephone advertisement program causing a computer to: acquire, in response to receiving a telephone talk request from a caller to a callee, callee information indicating a callee from a caller terminal device of the caller; acquire, based on the acquired callee information, advertisement content associated with a condition corresponding to an attribute of the callee among a plurality of pieces of advertisement content, each of the plurality of pieces of advertisement content being associated with a condition of a person to whom respective advertisement content is presented, the condition of the person being stored in a predetermined storage; and transmit the acquired advertisement content to the caller terminal device and thereby cause the caller terminal device to present the advertisement content within an invitation period during which the callee is being invited to answer an incoming call.

BRIEF DESCRIPTION OF DRAWINGS

FIG. 4 is a view showing an example of information stored in a database in the advertisement distribution server 2;

FIG. 6 is a view showing an example of information stored in a database in the DMP server 3;

FIG. 18 is a view showing an example of information stored in a database in the call control server 1;

FIG. 19 is a view showing a generation example of advertisement sound content;

FIG. 20 is a sequence diagram showing an operation example of the information communication system S;

FIG. 21 is a sequence diagram showing an operation example of the information communication system S;

FIG. 22 is a sequence diagram showing an operation example of the information communication system S; and FIG. 23 is a sequence diagram showing an operation example of the information communication system S.

DETAILED DESCRIPTION

Embodiments of the present invention will be described in detail below with reference to the drawings. The embodiments described below are embodiments in a case where the present invention is applied to a telephone advertisement system for causing a terminal device of a user to present an advertisement when the user makes a call in an IP phone service.

1. First Embodiment

[1-1. Configuration of Information Communication System]

First, the configuration and the function outline of an information communication system S according to the present embodiment will be described with reference to FIG. 1.

Figure 1:
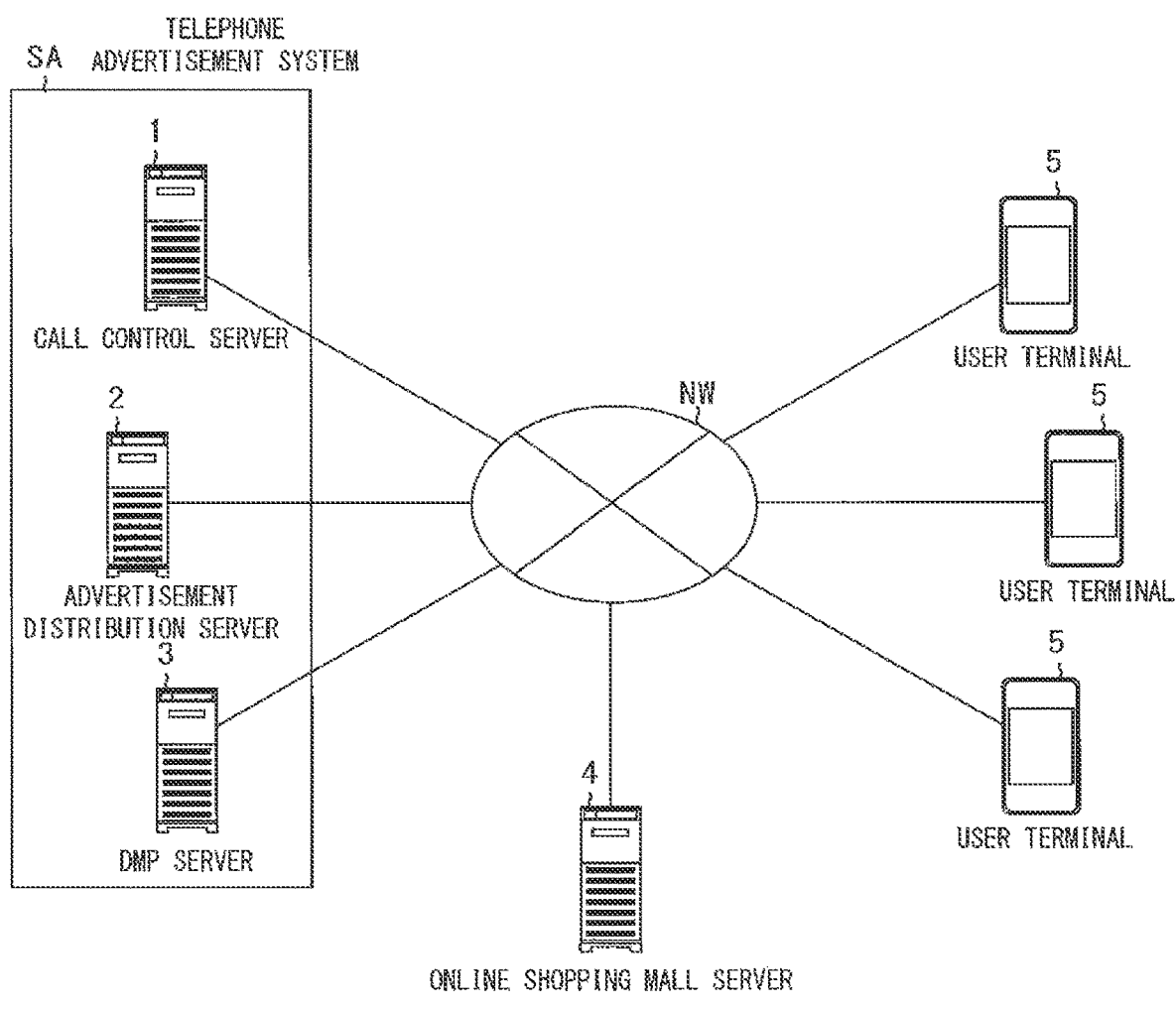
FIG. 1 is a view showing an example of a schematic configuration of an information communication system S according to an embodiment.

FIG. 1 is a view showing an example of a schematic configuration of the information communication system S according to the present embodiment. As shown in FIG. 1, the information communication system S includes a telephone advertisement system SA, an online shopping mall server 4, and a plurality of user terminals 5. The telephone advertisement system SA includes a call control server 1, an advertisement distribution server 2, and a data management platform (DMP) server 3. The call control server 1, the advertisement distribution server 2, the DMP server 3, the online shopping mall server 4, and the user terminals 5 can be connected to a network NW. The network NW includes, for example, the Internet, a dedicated communication line (e.g., a community antenna television (CATV) line), a mobile communication network (including a base station and the like), and a gateway.

The call control server 1 is a server device that performs call control using a protocol such as a session initiation protocol (SIP). For example, the call control server 1 registers location information such as an IP address of each of the user terminals 5. Upon receiving a call connection request from any of the user terminals 5, the call control server 1 performs a call connection between the user terminal 5 on the calling side and the user terminal 5 on the called side. The user on the calling side is referred to as a caller. The user terminal 5 on the calling side is referred to as a caller terminal 5-1. The user on the called side is referred to as a callee. The user terminal 5 on the called side is referred to as a callee terminal 5-2. The call control server 1 acquires advertisement content indicating an advertisement from the advertisement distribution server 2, and transmits this advertisement content to the caller terminal 5-1. As a result, the caller terminal 5-1 presents the advertisement content within the invitation period during which the callee is being invited to answer an incoming call. The invitation period may be a period of time during which the caller terminal 5-1 should originally make a ring-back tone. That is, the invitation period may be a period of time from when the invitation for the callee terminal 5-2 is started to when the callee performs an operation of answering the call on the callee terminal 5-2.

The advertisement distribution server 2 is a server device for distributing an advertisement to each of the user terminals 5. For example, the advertisement distribution server 2 acquires advertisement content from the DMP server 3. The advertisement distribution server 2 may generate new advertisement content based on the advertisement content acquired from the DMP server 3. The advertisement distribution server 2 transmits advertisement content to the call control server 1.

The DMP server 3 is a server device that stores thereon and manages various pieces of information regarding a predetermined online shopping mall. For example, the DMP server 3 may store information regarding a member of the online shopping mall. The DMP server 3 may store information regarding an advertisement of a store opened in the online shopping mall. The DMP server 3 selects the advertisement content to be transmitted to the advertisement distribution server 2 based on information regarding the member and information regarding the advertisement. The information stored in the DMP server 3 is not limited to information regarding the online shopping mall. For example, the DMP server 3 may store information regarding an online shopping site other than the online shopping mall, a flea market site, an electronic book sales site, a hotel reservation site, a beauty salon reservation site, a golf course reservation site, a delivery reservation site, and the like.

The online shopping mall server 4 is a server device that executes processing regarding an online shopping mall in which an advertiser in the telephone advertisement system SA opens a store. For example, the online shopping mall server 4 transmits a web page in the online shopping mall in response to a request from each of the user terminals 5. The online shopping mall server 4 executes processing regarding the sale of an item for sale in the online shopping mall. The DMP server 3 may be incorporated in the online shopping mall server 4.

Each of the user terminals 5 is a portable terminal device possessed by a user who is a member of an IP telephone service provided by the call control server 1. Each of the user terminals 5 has a telephone function. Normally, each of the user terminals 5 includes a microphone and an earpiece. A dedicated application for using the IP telephone service may be installed in each of the user terminals 5. Examples of the user terminals 5 include a portable information terminal such as a smartphone and a tablet computer, a mobile phone, and a personal digital assistant (PDA). Note that the IP telephone service may be available using a stationary terminal device such as a personal computer or a set-top box.

[1-2. Configuration of Each Device]

[1-2-1. Configuration of Call Control Server]

Figure 2:
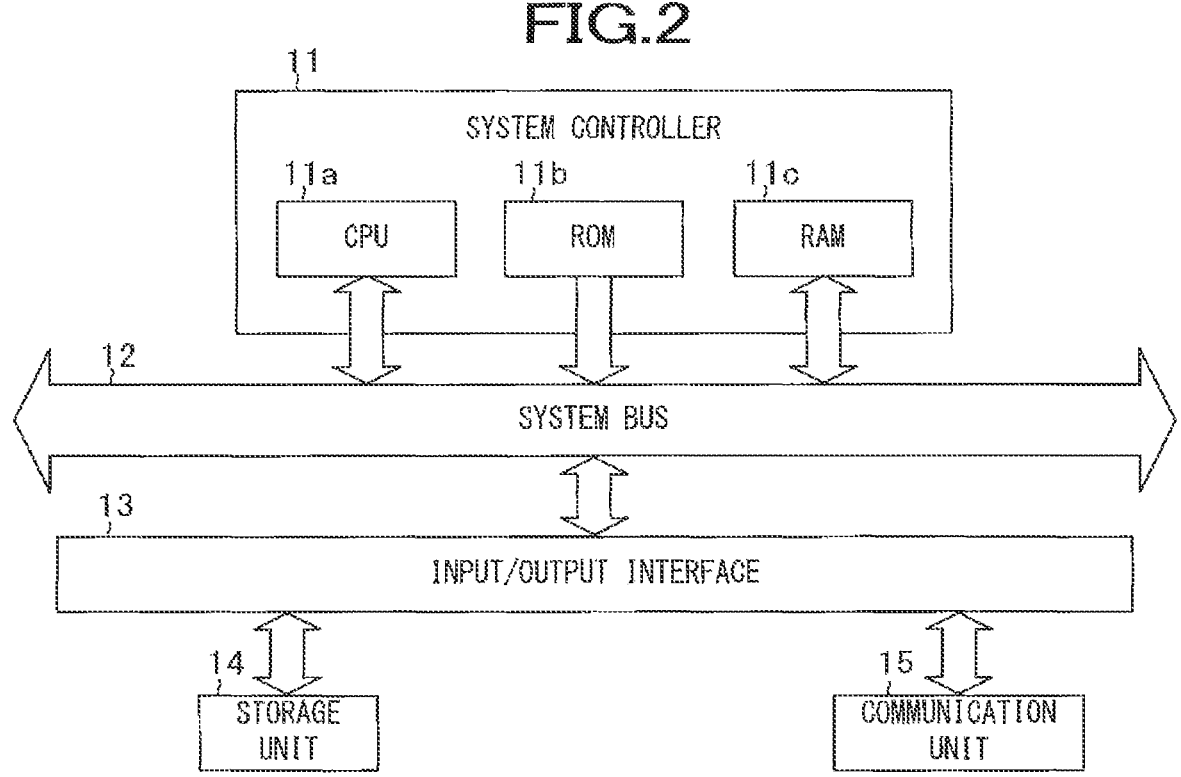
FIG. 2 is a block diagram showing an example of a schematic configuration of a call control server 1 according to an embodiment.

Next, the configuration of the call control server 1 will be described with reference to FIG. 2. FIG. 2 is a block diagram showing an example of a schematic configuration of the call control server 1 according to an embodiment. As shown in FIG. 2, the call control server 1 includes a system controller 11, a system bus 12, an input/output interface 13, a storage unit 14, and a communication unit 15. The system controller 11 and the input/output interface 13 are connected via the system bus 12.

The system controller 11 includes a central processing unit (CPU) 11a, a read only memory (ROM) 11b, and random access memory (RAM) 11c.

The input/output interface 13 performs interface processing between the storage unit 14 and the communication unit 15, and the system controller 11.

The storage unit 14 includes, for example, a hard disk drive. The storage unit 14 stores thereon various programs such as an operating system, a database management system (DBMS), and a call control server program. The call control server program is a program that causes the system controller 11 to execute processing regarding call control and processing regarding provision of an advertisement. For example, the call control server program may be acquired from another device via the network NW, or may be recorded on a recording medium such as a magnetic tape, an optical disk, or a memory card and read via a drive device.

The communication unit 15 includes, for example, a network adapter. The communication unit 15 is connected to the advertisement distribution server 2, the user terminals 5, and the like via the network NW, and controls a communication state with these devices.

[1-2-2. Configuration of Advertisement Distribution Server]

Next, the configuration of the advertisement distribution server 2 will be described with reference to FIGS. 3 and 4.

Figure 3:
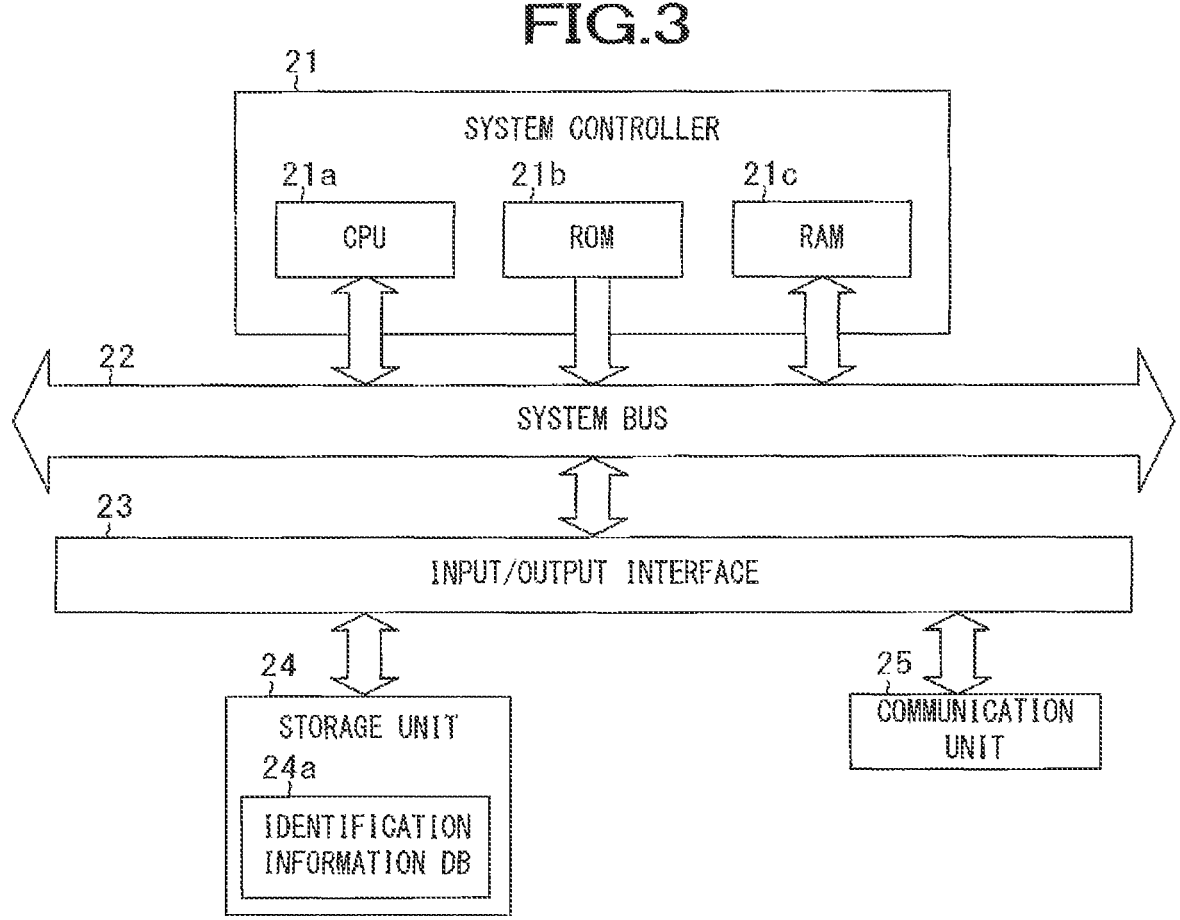
FIG. 3 is a block diagram showing an example of a schematic configuration of an advertisement distribution server 2 according to an embodiment.

FIG. 3 is a block diagram showing an example of a schematic configuration of the advertisement distribution server 2 according to the present embodiment. As shown in FIG. 3, the advertisement distribution server 2 includes a system controller 21, a system bus 22, an input/output interface 23, a storage unit 24, and a communication unit 25. The system controller 21 and the input/output interface 23 are connected via the system bus 22.

The system controller 21 includes a CPU 21a, a ROM 21b, and a RAM 21c.

The input/output interface 23 performs interface processing between the storage unit 24 and the communication unit 25, and the system controller 21.

The storage unit 24 includes, for example, a hard disk drive. The storage unit 24 stores thereon a database such as an identification information DB 24a. "DB" is an abbreviation for database.

FIG. 4 is a view showing an example of information stored in a database in the advertisement distribution server 2. The identification information DB 24a is a database that indicates information for identifying a user in the IP phone service and information for identifying the user in the online shopping mall in association with each other. For example, the identification information DB 24a stores thereon a terminal ID and a user ID in association with each other for each user. The terminal ID is identification information for identifying the user terminal 5 used by the user in the IP telephone service. Examples of the terminals ID include a uniform resource identifier (URI), a telephone number, and a media control access (MAC) address. The user ID is information for identifying a user in the online shopping mall.

The storage unit 24 further stores thereon a various programs such as an operating system, a DBMS, and an advertisement distribution server program. The advertisement distribution server program is a program that causes the system controller 21 to execute various processing regarding advertisement distribution. For example, the advertisement distribution server program may be acquired from another device via the network NW, or may be recorded on a recording medium such as a magnetic tape, an optical disk, or a memory card and read via a drive device.

The communication unit 25 includes, for example, a network adapter. The communication unit 25 is connected to the call control server 1 and the DMP server 3 via the network NW, and controls a communication state with these devices.

[1-2-3. Configuration of DMP Server]

Figure 5:
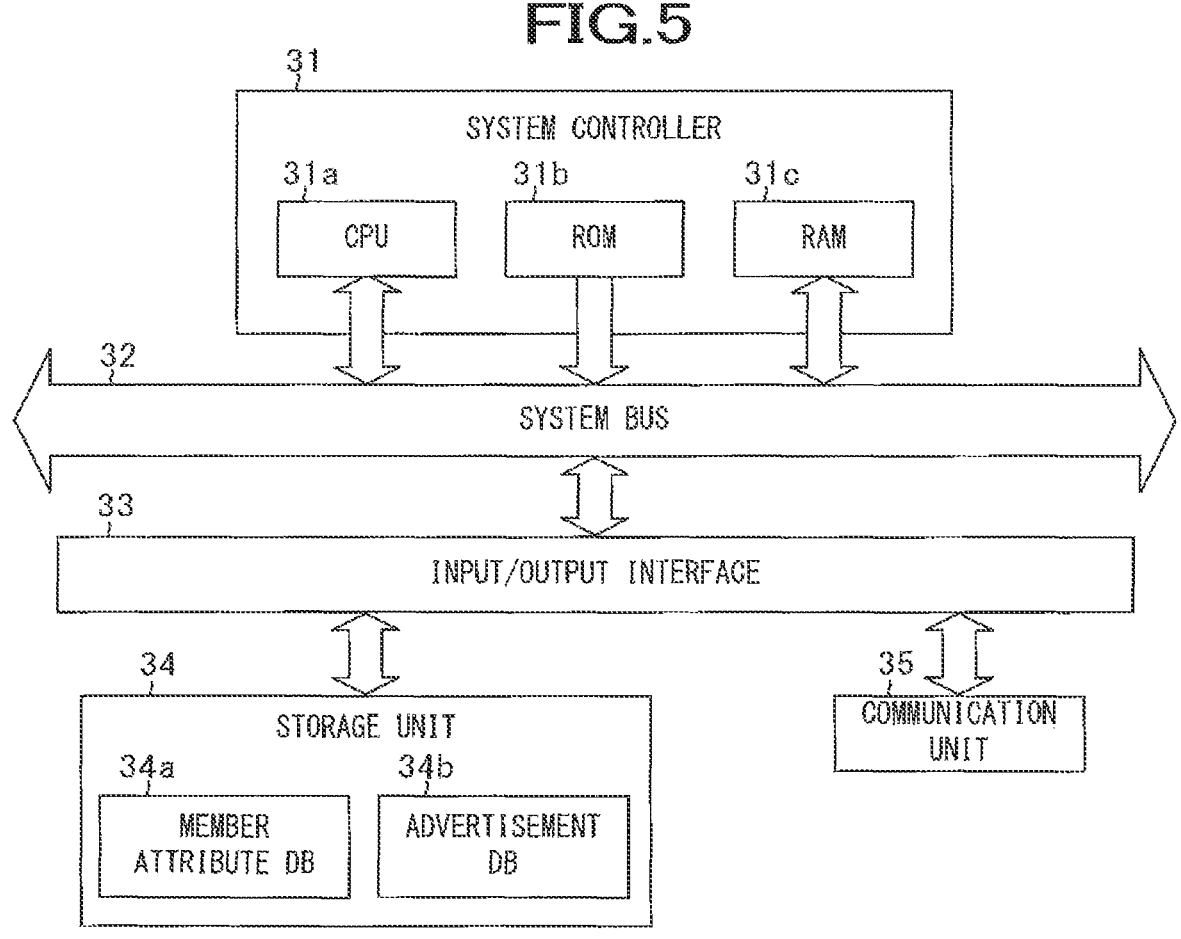
FIG. 5 is a block diagram showing an example of a schematic configuration of a DMP server 3 according to an embodiment.

Next, the configuration of the DMP server 3 will be described with reference to FIGS. 5 and 6. FIG. 5 is a block diagram showing an example of a schematic configuration of the DMP server 3 according to the present embodiment. As shown in FIG. 5, the DMP server 3 includes a system controller 31, a system bus 32, an input/output interface 33, a storage unit 34, and a communication unit 35. The system controller 31 and the input/output interface 33 are connected via the system bus 32.

The system controller 31 includes a CPU 31a, a ROM 31b, and a RAM 31c.

The input/output interface 33 performs interface processing between the storage unit 34 and the communication unit 35, and the system controller 31.

The storage unit 34 includes, for example, a hard disk drive. The storage unit 34 stores thereon a database such as a member attribute DB 34a and an advertisement DB 34b.

FIG. 6 is a view showing an example of information stored in a database in the DMP server 3. The member attribute DB 34*a* stores thereon, for each user, information regarding an attribute of a user who can use the online shopping mall. For example, the member attribute DB 34*a* stores a user ID, a telephone number, user attribute information, and the like in association with one another. The telephone number is a telephone number of the user indicated by the user ID. The telephone number may be a telephone number allocated by the IP telephone service provided by the call control server 1 or may be a telephone number allocated by another telephone service (e.g., another IP telephone service, a public switched network, a mobile communication service, or the like). The user attribute information is information indicating at least one attribute of the user indicated by the user ID. Examples of the attribute of the user include a birth year, a gender, an address, an occupation, a membership rank in an online shopping mall, an interest, and a behavior tendency. For example, the user may register the attribute as the membership information when or after the user becomes a member of the online shopping mall. Furthermore, the user may register the attribute in a form of answering a questionnaire, for example. Alternatively, the DMP server 3 or the online shopping mall server 4 may identify the interest or the behavior tendency of the user based on the behavior of the user in the online shopping mall. For example, the DMP server 3 or the online shopping mall server 4 stores a history of behavior of each user in the online shopping mall. Examples of the stored history include a sale item purchase history and web page browse history. Based on such a history, it is possible to identify various attributes such as a category of a user's favorite sale item, a user's favorite store, a purchase frequency of an item for sale in a specific category, an item for sale that the user has purchased or an item for sale that the user has not purchased, a use frequency of an online shopping mall, and a tendency of an amount of money used for purchasing an item for sale. For example, the DMP server 3 may periodically update the user attribute information with reference to the history of the behavior in the online shopping mall. The user attribute information may include information indicating the user's situation. Examples of the user's situation include a current location of the user. For example, if the user terminal 5 has a positioning function using a global positioning satellite (GPS) or the like, the current location of the user can be acquired. Each of the user terminals 5 may periodically measure the current location of the user terminal 5, and transmit the location information indicating the measured current location to the DMP server 3. The DMP server 3 may include at least the latest location information in the user attribute information for each of the users. In the user attribute information, a value indicating each attribute may be associated with information for identifying an attribute name or an item name (e.g., "gender", "age", and the like) corresponding to the attribute.

In the advertisement DB 34*b*, information regarding the advertisement distributed in the information communication system S is stored for each item for sale to be advertised, for example. For example, information such as an advertiser ID, an advertisement ID, advertisement content, an advertisement cost, a linked URL, and target condition information is stored in the advertisement DB 34*b* in association with one another. The advertiser ID is identification information for identifying a store that is an advertiser. The advertisement ID is identification information for identifying an advertisement. The advertisement content is data indicating an advertisement. For example, the advertisement content may be video data, still image data, or text data. Examples of video data formats include MPEG2-TS, MP4, and Flash Video (FLV). Examples of still image data formats include Joint Photographic Experts Group (JPEG) and Graphics Interchange Format (GIF). Alternatively, the advertisement content may be a combination of at least two of video data, still image data, and text data. For example, the advertiser may be able to select, as the advertisement content, any of the contents registered in the online shopping mall by the advertiser. For example, the advertisement content may be the same as the image data of the thumbnail displayed on the web page listing the items for sale of the online shopping mall. Alternatively, the advertisement content may be the same as data of a video or a still image appears in a sale item page, which is a web page displaying details of item for sale to be advertised. Note that, in the present embodiment, it is assumed that video data with sound can be designated as the advertisement content. The advertisement cost is an advertising rate paid by the advertiser based on distribution of an advertisement. Examples of the advertisement cost include cost per mille (CPM) and cost per click (CPC). The linked URL is a URL of a sale item page of an item for sale to be advertised. The target condition information indicates a target condition of a user to whom the advertisement is presented. That is, the target condition information indicates what condition is satisfied by users to whom the advertisement is to be presented. Specifically, the target condition information indicates an attribute of the user to whom it is presented. For example, the same type of attribute as the type of attribute that can be indicated by the user attribute information stored in the member attribute DB 34*a* may be designated as the target condition. The advertisement content, the advertisement cost, the linked URL, and the target condition information can be designated by the advertiser.

The storage unit 34 further stores various programs such as an operating system, a DBMS, and a DMP server program. The DMP server program is a program that causes the system controller 31 to execute various processing regarding management of the user attribute and the like and advertisement selection. For example, the DMP server program may be acquired from another device via the network NW, or may be recorded on a recording medium such as a magnetic tape, an optical disk, or a memory card and read via a drive device.

The communication unit 35 includes, for example, a network adapter. The communication unit 35 is connected to the advertisement distribution server 2 and the online shopping mall server 4 via the network NW, and controls a communication state with these devices.

[1-2-4. Configuration of User Terminal]

Figure 7:
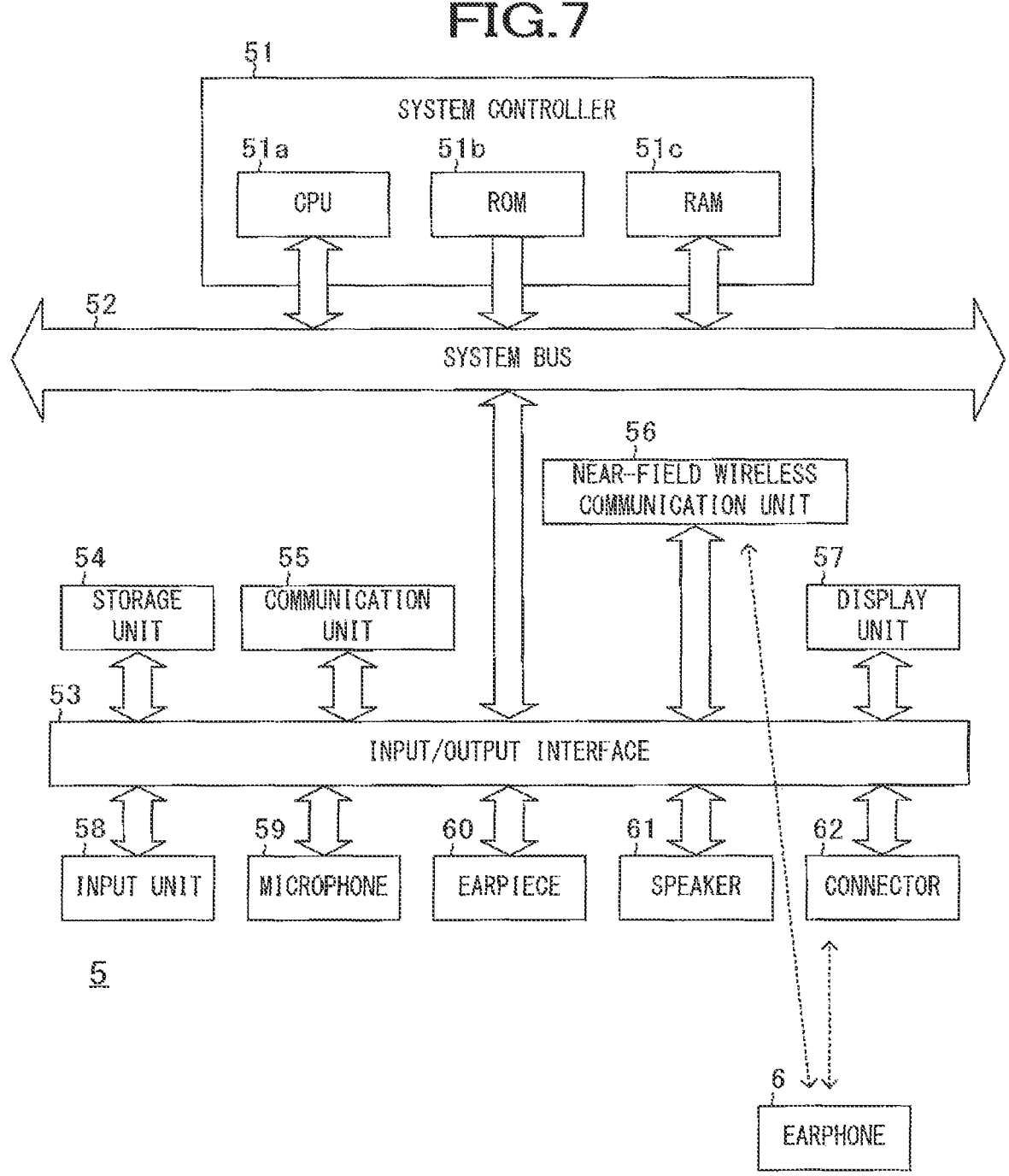
FIG. 7 is a block diagram showing an example of a schematic configuration of a user terminal 5 according to an embodiment.

Next, the configuration of the user terminal 5 will be described with reference to FIG. 7. FIG. 7 is a block diagram showing an example of a schematic configuration of the user terminal 5 according to the present embodiment. As shown in FIG. 7, the user terminal 5 includes a system controller 51, a system bus 52, an input/output interface 53, a storage unit 54, a communication unit 55, a near-field wireless communication unit 56, a display unit 57, an input unit 58, a microphone 59, an earpiece 60, a speaker 61, and a connector 62. The system controller 51 and the input/output interface 53 are connected via the system bus 52.

The system controller 51 includes a CPU 55*a*, a ROM 55*b*, and a RAM 55*c*.

The input/output interface 53 performs interface processing between the storage unit 54, the communication unit 55, the near-field wireless communication unit 56, the display unit 57, the input unit 58, the microphone 59, the earpiece 60, the speaker 61, and the earphone jack 61, and the system controller 51.

The storage unit 54 includes, for example, a flash memory or a hard disk drive. The storage unit 54 stores various programs such as an operating system, a web browser, and a dedicated application for IP phone. The dedicated application is a program that causes the system controller 51 to execute processing regarding an IP phone and processing regarding presentation of an advertisement. For example, the dedicated application may be acquired from another device via the network NW, or may be recorded in a recording medium such as a memory card and read via a drive device.

The communication unit 55 is connected to the network NW via a mobile communication network, a wireless local area network (LAN), or the like. The communication unit 55 includes, for example, a network adapter and an antenna. The communication unit 55 is connected to the call control server 1, the online shopping mall server 4, and the like via the network NW, and controls a communication state with these devices.

The near-field wireless communication unit 56 has a near-field wireless communication function for performing wireless communication with another device within a relatively short distance from the user terminal 5. The near-field wireless communication unit 56 includes, for example, a network adapter and an antenna. The standard of the near-field wireless communication may be, for example, Bluetooth (registered trademark) or the like. The display unit 57 displays information such as an image and character based on control by the system controller 51. Examples of the display unit 57 include a liquid crystal display and an organic EL display.

The input unit 58 receives an operation by the user and outputs a signal corresponding to the operation content to the system controller 21. Examples of the input unit 58 include a button, a switch, and a touchscreen.

The microphone 59 converts a sound such as a user's sound into a sound signal. The microphone 59 outputs this sound signal to, for example, the system controller 51. The microphone 59 is generally disposed below the screen of the display unit 57 on the user terminal 5.

The earpiece 60 is a speaker for outputting mainly voices of a person on the other end of the line with whom the user of the user terminal 5 speaks on the phone. The earpiece 60 is generally disposed above the screen of the display unit 57 on the user terminal 5.

The speaker 61 is a speaker for outputting mainly a sound (e.g., music, sound of a video, a ringtone, and the like) other than the voice of the person on the other end of the line. The speaker 61 is generally disposed below the screen of the display unit 57 on the user terminal 5.

The connector 62 is a terminal to which a plug of an earphone 6 is connected. Examples of the connector 62 include an earphone jack and a universal serial bus (USB) connector.

Telephone voice output modes indicating a mode of outputting the voice of the person on the other end of the line during a phone call include a normal mode, an earphone mode, and a speaker mode. The normal mode is a mode in which the voice of the person on the other end of the line is output from the earpiece 60.

The earphone mode is a mode in which the voice of the person on the other end of the line is output from the earphone 6. The earphone 6 is a device that converts an electric signal into a sound wave by sound output parts such as a speaker inserted into an ear, applied to the ear, or brought close to the ear, for example. Examples of the earphone 6 include a headphone, a headset, and an earset in addition to the earphone itself. The earphone 6 may be a wired earphone or a wireless earphone. When the earphone 6 is connected to the user terminal 5, the telephone voice output mode becomes the earphone mode. For example, if the earphone 6 is a wired earphone, the earphone 6 and the user terminal 5 may be connected by connecting the plug of the earphone 6 to the connector 62. The user terminal 5 transmits a sound signal to the earphone 6 via the connector 62. Alternatively, if the earphone 6 is a wireless earphone, the earphone 6 and the user terminal 5 may be connected by establishing wireless connection between the earphone 6 and the near-field wireless communication unit 56. The user terminal 5 transmits a sound signal from the near-field wireless communication unit 56 to the earphone 6. Note that the user terminal 5 may include only one of the near-field wireless communication unit 56 and the connector 62.

The speaker mode is a mode in which the voice of the person on the other end of the line is output from the speaker 61. The maximum volume that can be set by the user when the voice of the person on the other end of the line is output from the speaker 61 in the speaker mode is larger than the maximum volume that can be set by the user when the voice of the person on the other end of the line is output from the earpiece 60 in the normal mode. That is, the maximum value of the amplification degree of the sound in the speaker mode is larger than the maximum value of the amplification degree of the sound in the normal mode. Therefore, when in the speaker mode, even if the user holds the user terminal 5 at a position relatively away from the user's ear, the user can hear the voice of the person on the other end of the line. The user can change the volume of the voice of the person on the other end of the line during the call. The maximum value of the changeable volume varies depending on the telephone voice output mode. In the speaker mode, the user terminal 5 may output sounds from both the earpiece 60 and the speaker 61.

It is conceivable that not the earphone 6 but an external speaker is connected to the user terminal 5. That is, a plug of the external speaker is connected to the connector 62, or an external wireless speaker is wirelessly connected to the near-field wireless communication unit 56. In this case, the user terminal 5 may determine the telephone voice output mode to be any of the earphone mode and the speaker mode.

[1-3. Function Outline of System Controller]

[1-3-1. Call Control Server]

Figure 8:
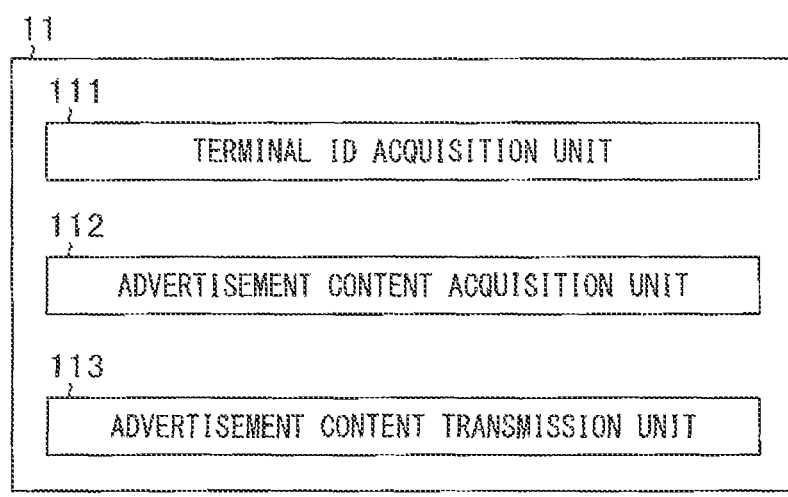
FIG. 8 is a view showing an example of a functional block of a system controller 11 of the call control server 1 according to an embodiment.

Next, a functional outline of the system controller 11 of the call control server 1 will be described with reference to FIG. 8. FIG. 8 is a view showing an example of the functional block of the system controller 11 of the call control server 1 according to the present embodiment. By the CPU 11a reading and executing various program codes included in the call control server program, the system controller 11 functions as a terminal ID acquisition unit 111, an advertisement content acquisition unit 112, an advertisement content transmission unit 113, and the like as shown in FIG. 8.

The terminal ID acquisition unit 111 acquires a terminal ID indicating a callee in response to receiving, from a caller terminal 5-1 of the caller, a telephone talk request from the caller to the callee. For example, the terminal ID acquisition unit 111 acquires a terminal ID associated with the phone number of the callee transmitted from the caller terminal 5-1. For example, the terminal ID acquisition unit 111 may acquire the URI of the callee as the terminal ID by transmitting the telephone number of the callee to a predetermined domain name system (DNS) that stores the telephone number and the terminal ID of the user terminal 5 in association with each other for each user.

The callee is not necessarily a member of the telephone service provided by the call control server 1. For example, there is a case where the phone number of the callee input by the caller is a phone number assigned by a phone service (for example, another IP telephone service, a public switched network, a mobile communication service, or the like) different from the phone service provided by the call control server 1. In this case, the terminal ID acquisition unit 111 may acquire, as the terminal ID, the phone number of the callee transmitted from the caller terminal 5-1. Note that, in a case where the callee is not a member of the telephone service provided by the call control server 1, call connection between the caller terminal 5-1 and the terminal device of the callee is performed via a predetermined gateway server, for example.

Based on the terminal ID acquired by the terminal ID acquisition unit 111, the advertisement content acquisition unit 112 acquires advertisement content associated with the target condition corresponding to the attribute of the callee among the plurality of pieces of the advertisement content associated with target conditions of a person to whom the advertisement is presented. For example, the advertisement content acquisition unit 112 transmits the terminal ID acquired by the terminal ID acquisition unit 111 to the advertisement distribution server 2. The advertisement content acquisition unit 112 acquires the advertisement content transmitted from the advertisement distribution server 2 accordingly. In particular, in the present embodiment, advertisement sound content is acquired as the advertisement content. The advertisement sound content is data of a sound indicating an advertisement. Examples of the advertisement sound content formats include Advanced Audio Coding (AAC) and MPEG-1 Audio Layer-3 (MP3).

The advertisement content transmission unit 113 transmits the advertisement content acquired by the advertisement content acquisition unit 112 to the caller terminal 5-1 to cause the caller terminal 5-1 to present the advertisement content within an invitation period during which the callee is being invited to answer an incoming call. In particular, in the present embodiment, the advertisement content transmission unit 113 transmits the advertisement sound content, and whereby causes the caller terminal 5-1 to output the sound of the advertisement within the period during which a ring-back tone should be output.

[1-3-2. Advertisement Distribution Server]

Figure 9:
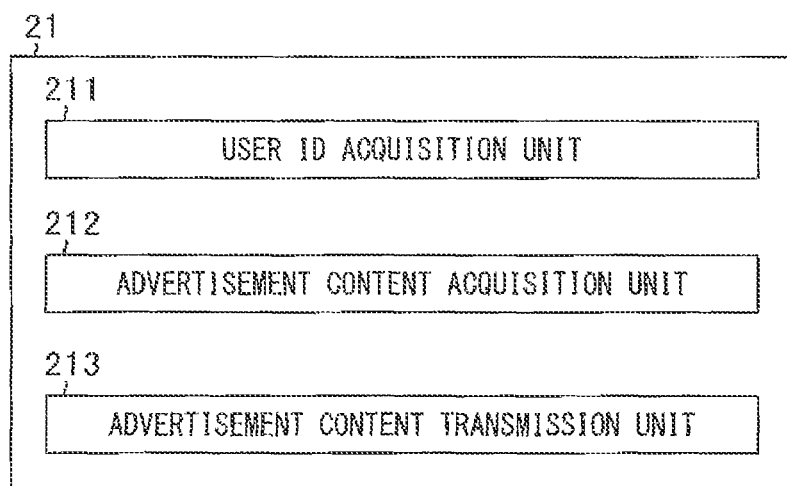
FIG. 9 is a view showing an example of a functional block of a system controller 21 of the advertisement distribution server 2 according to an embodiment.
Figure 10:
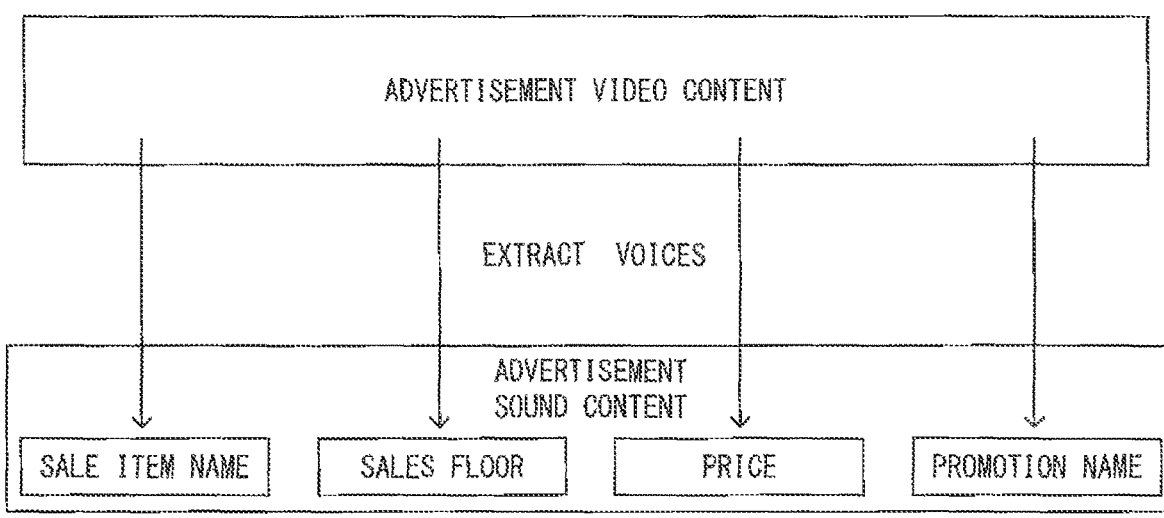
FIG. 10 is a view showing a generation example of advertisement sound content.

Next, a functional outline of the system controller 21 of the advertisement distribution server 2 will be described with reference to FIGS. 9 and 10. FIG. 9 is a view showing an example of a functional block of the system controller 21 of the advertisement distribution server 2 according to the present embodiment. By the CPU 21a reading and executing various program codes included in the advertisement distribution server program, the system controller 21 functions as a user ID acquisition unit 211, an advertisement content acquisition unit 212, an advertisement content transmission unit 213, and the like as shown in FIG. 9.

The user ID acquisition unit 211 acquires a user ID indicating a callee in response to transmission, from the caller terminal 5-1, of the telephone talk request from the caller to the callee. For example, the user ID acquisition unit 211 acquires the terminal ID of the callee transmitted from the call control server 1. The user ID acquisition unit 211 acquires the user ID stored in the identification information DB 24a in association with the acquired terminal ID.

Based on the user ID acquired by the user ID acquisition unit 211, the advertisement content acquisition unit 212 acquires the advertisement content associated with the target condition corresponding to the attribute of the callee among the plurality of pieces of the advertisement content associated with the target conditions of a person to whom the advertisement is presented. For example, the advertisement content acquisition unit 212 transmits the acquired user ID to the DMP server 3. The advertisement content acquisition unit 212 acquires the advertisement content transmitted from the DMP server 3 accordingly. In particular, in the present embodiment, the advertisement content acquisition unit 212 acquires advertisement video content from the DMP server 3. The advertisement video content acquired in the present embodiment is data of a video with sound indicating an advertisement.

When the callee is not a member of the telephone service provided by the call control server 1, the telephone number of the callee is transmitted from the call control server 1. At this time, the user ID of the callee cannot be acquired. In this case, an advertisement content acquisition unit 212 transmits the phone number of the callee to the DMP server 3.

By generating advertisement sound content based on the sound extracted from the advertisement video content acquired from the DMP server 3, the advertisement content acquisition unit 212 may acquire the advertisement sound content. FIG. 10 is a view showing a generation example of advertisement sound content. For example, the advertisement content acquisition unit 212 may execute sound recognition by performing processing such as Fourier transform on the sound data included in the advertisement video content. By sound recognition and morphological analysis, the advertisement content acquisition unit 212 recognizes a plurality of terms represented by voices uttered by someone in the video. The advertisement content acquisition unit 212 extracts a data part corresponding to each recognized term from the sound data. The advertisement content acquisition unit 212 extracts a term corresponding to a predetermined item from the recognized terms. For example, the advertisement content acquisition unit 212 may extract a sale item name, a sales floor name, a price, a promotion name, and the like. The sales floor name may be, for example, a name of a website where an advertised sale item can be purchased. The promotion name is a name of a promotion conducted by an advertiser in relation to sales of an item for sale. For example, dictionary data of each of the sale item name, the sales floor name, and the promotion name may be stored in the storage unit 24 of the advertisement distribution server 2. The advertisement content acquisition unit 212 may determine the sale item name, the sales floor name, and the promotion name by comparing each recognized term with the dictionary data. The advertisement content acquisition unit 212 may generate advertisement sound content by combining, in a predetermined order, the sound data of the term of each item extracted. At this time, the advertisement content acquisition unit 212 may insert sound data of a word such as an appropriate particle or a verb after sound data of any term according to situations. Note that the advertisement content acquisition unit 212 may generate advertisement sound content for each advertisement in advance and store the advertisement sound content in the storage unit 24.

In the present embodiment, the user terminal 5-1 is caused to output the advertisement sound instead of the ring-back tone. However, there are relatively few cases where a web site or a web page on which information regarding an item for sale or service that can be an advertisement target is shown has sound data regarding the item for sale or service in advance. Therefore, many advertisers need to create new advertisement sound content. On the other hand, there are relatively many cases where a web site or a web page on which information regarding an item for sale or service is shown has a video. Therefore, the information communication system S automatically generates the advertisement sound content using the already existing video, and whereby the burden on the advertiser can be reduced.

The advertisement content transmission unit 213 transmits, to the call control server 1, the advertisement content acquired by the advertisement content acquisition unit 212. In particular, in the present embodiment, the advertisement content transmission unit 213 transmits the advertisement sound content generated by the advertisement content acquisition unit 212.

[1-3-3. DMP Server]

Figure 11:
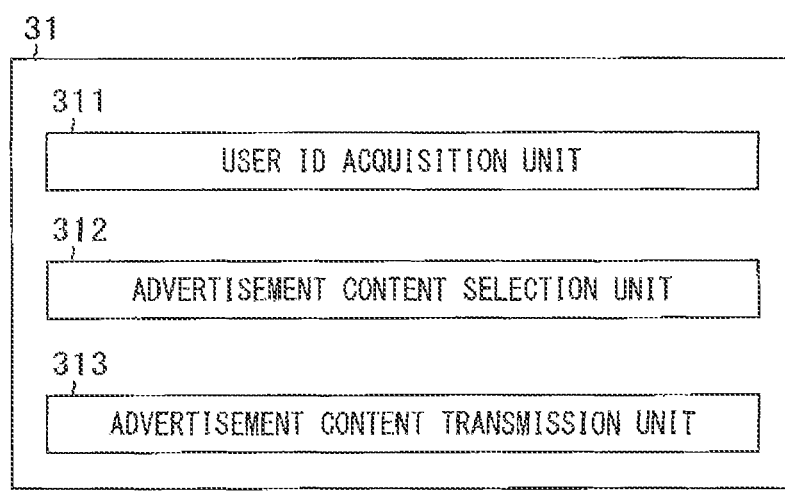
FIG. 11 is a view showing an example of a functional block of a system controller 31 of the DMP server 3 according to an embodiment.

Next, a functional outline of the system controller 31 of the DMP server 3 will be described with reference to FIG. 11. FIG. 11 is a view showing an example of a functional block of the system controller 31 of the DMP server 3 according to the present embodiment. By the CPU 31a reading and executing various program codes included in the DMP server program, the system controller 31 functions as a user ID acquisition unit 311, an advertisement content selection unit 312, an advertisement content transmission unit 313, and the like as shown in FIG. 11.

The user ID acquisition unit 311 acquires the user ID of a callee transmitted from the advertisement distribution server 2 in response to transmission, from the caller terminal 5-1, of a telephone talk request from the caller to the callee.

The advertisement content selection unit 312 selects advertisement content associated with a target condition corresponding to the attribute of the callee indicated by the user ID acquired by the user ID acquisition unit 311 from among a plurality of pieces of advertisement content stored in the advertisement DB 34b. The correspondence between the attribute of the callee and the target condition may mean that the attribute of the callee and the attribute of the user to whom the advertisement is presented are the same or similar to each other. The attribute of the user to whom the advertisement is presented is indicated by the target condition. For example, the target condition corresponding to the attribute of the callee may be a target condition in which a similarity degree between the attribute of the callee and the attribute of the user to whom the advertisement is presented is the highest, a target condition in which the similarity degree is equal to or greater than a predetermined value, or a target condition in which the similarity degree is relatively high. The similarity degree may be a ratio of attributes that are the same or similar between the callee and the user to whom the advertisement is presented, among attributes of the callee and attributes of the user to whom the advertisement is presented. The advertisement content selection unit 312 may calculate the similarity degree of the attributes for each advertisement content based on the user attribute information stored in the member attribute DB 34a in association with the acquired user ID and the target condition information of the respective advertisement stored in the advertisement DB 34b. The advertisement content selection unit 312 may select the advertisement content having the highest similarity degree of the attributes. The advertisement content selection unit 312 may select the advertisement content based on the similarity degree of the attributes and the advertisement cost. For example, the advertisement content selection unit 312 may calculate the score by using a calculation formula with the similarity degree of the attributes and the advertisement cost as variables. At this time, the higher the similarity degree of the attributes is, the higher the score may be calculated by the advertisement content selection unit 312. The higher the advertisement cost, the higher the score may be calculated by the advertisement content selection unit 312. Then, the advertisement content selection unit 312 may select the advertisement content for which the highest score is calculated. Alternatively, the advertisement content selection unit 312 may first extract the advertisement content having the similarity degree of the attribute that is equal to or greater than a predetermined value. Next, the advertisement content selection unit 312 may select the advertisement content having the highest advertisement cost from the extracted advertisement contents.

If the callee is not a member of the telephone service provided by the call control server 1, the telephone number of the callee is transmitted from the advertisement distribution server 2. In this case, the advertisement content selection unit 312 searches the member attribute DB 34a for the phone number matching the phone number of the callee. If there is a phone number that matches the phone number of the callee, the advertisement content selection unit 312 uses the user attribute information associated with the phone number. Among users who are not members of the telephone service provided by the call control server 1, users who are members of the online shopping mall exist. By using the telephone number, it is possible to identify the attribute of the user who is not a member of the telephone service provided by the call control server 1.

The advertisement content transmission unit 313 transmits the advertisement content selected by the advertisement content selection unit 312 to the advertisement distribution server 2.

In this way, an advertisement corresponding to the attribute of the callee is presented to the caller. It is presumed that the caller and the callee are in a relationship in which they talk together. Thus, there may be some commonality between the caller and the callee. For example, the caller and the callee possibly have a common preference or interest. There is a possibility that such a common attribute has not been able to be identified from the past behavior by the caller or the situation of the caller in the websites such as online shopping malls. The attribute that has not been able to be identified from the behavior or situation may be an attribute that the caller himself/herself has not noticed. By presenting such an advertisement corresponding to the attribute of the caller that has not been able to be identified so far, it is possible to make the caller feel surprised and notice the potential attribute of the caller. Therefore, it is considered that the effect of the advertisement is enhanced.

Note that the advertisement content selection unit 312 may update the user attribute information of the caller by adding at least one of the attributes indicated by the user attribute information of the callee to the user attribute information of the caller.

[1-3-4. User Terminal]

Figure 12:
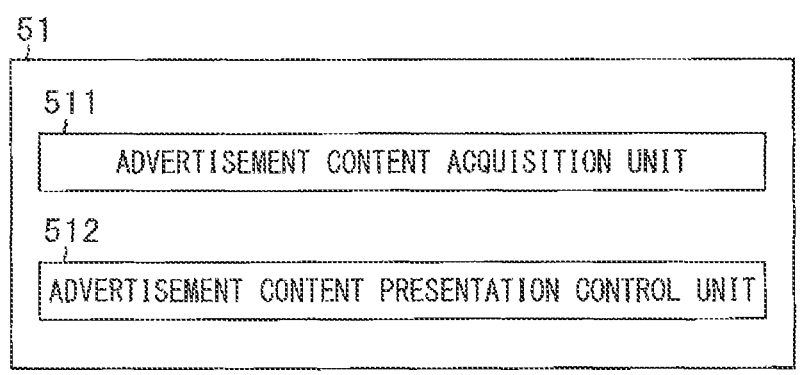
FIG. 12 is a view showing an example of a functional block of a system controller 51 of the user terminal 5 according to an embodiment.

Next, a functional outline of the system controller 51 of the user terminal 5 will be described with reference to FIG. 12. FIG. 12 is a view showing an example of a functional block of the system controller 51 of the user terminal 5 according to the present embodiment. By the CPU 51a reading and executing various program codes included in the dedicated application, the system controller 51 functions as an advertisement content acquisition unit 511, an advertisement content presentation control unit 512, and the like as shown in FIG. 12.

The advertisement content acquisition unit 511 acquires the advertisement content transmitted from the call control server 1 in response to transmitting the telephone talk request to the call control server 1 based on a user operation.

The advertisement content presentation control unit 512 presents, to the user, the advertisement content acquired by the advertisement content acquisition unit 511. In the present embodiment, by play the advertisement sound content, the advertisement content presentation control unit 512 causes the earpiece 60, the speaker 61, or the earphone 6 to output the advertisement sound according to the telephone voice output mode. Thus, instead of the ring-back tone, the advertisement sound is produced. Note that the advertisement sound may be output together with the ring-back tone.

[1-4. Operation of Information Communication System]

Next, the operation of the information communication system S will be described with reference to FIG. 13.

Figure 13:
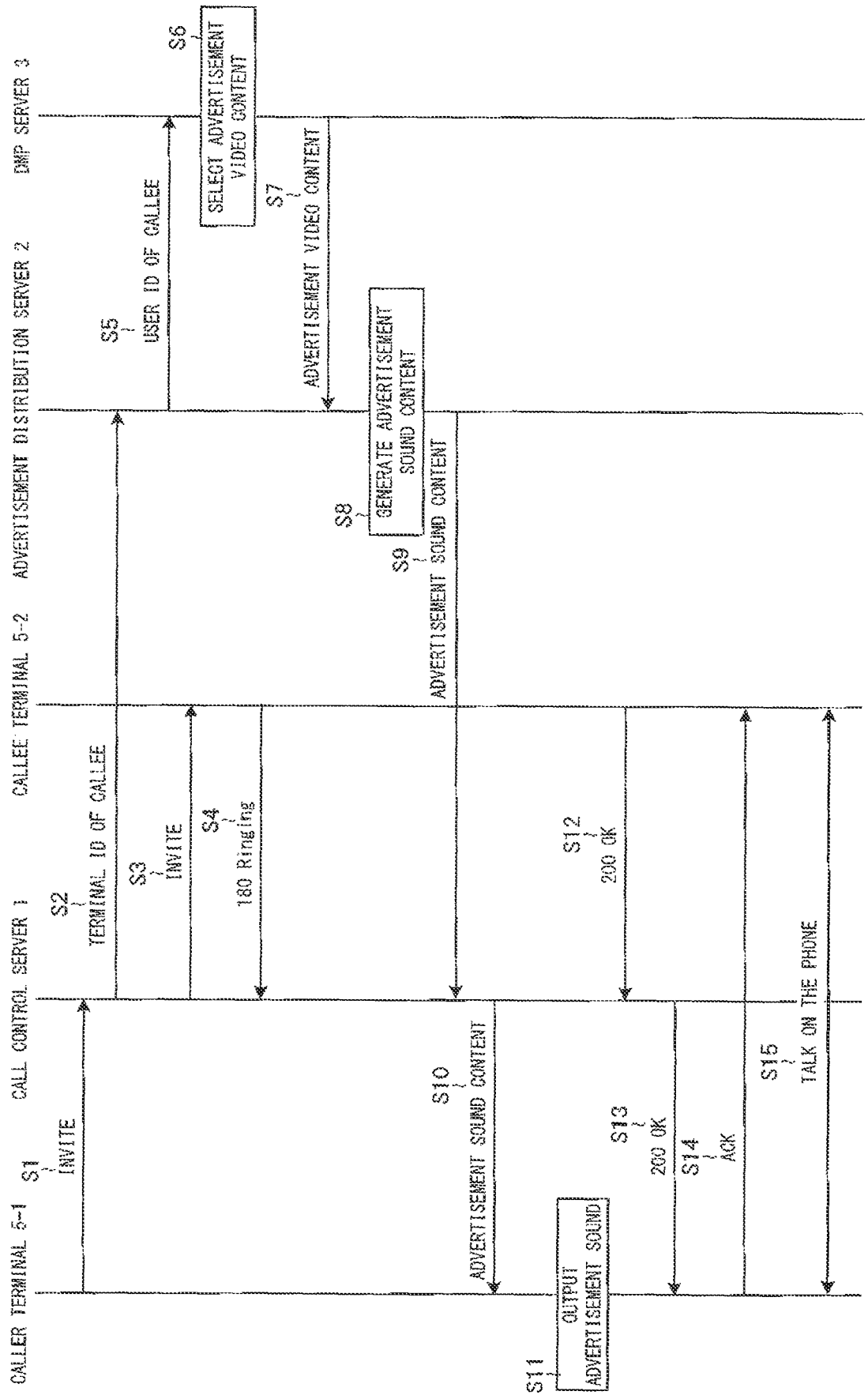
FIG. 13 is a sequence diagram showing an operation example of the information communication system S.

FIG. 13 is a sequence diagram showing an operation example of the information communication system S. The caller operates the caller terminal 5-1 to activate the dedicated application. The caller then enters the telephone number of the callee or selects the callee. In response to this, as shown in FIG. 13, the caller terminal 5-1 transmits an INVITE message including the telephone number of the callee to the call control server 1 as a telephone talk request (step S1). The terminal ID acquisition unit 111 of the call control server 1 acquires the terminal ID of the callee associated with the telephone number included in the INVITE message. The advertisement content acquisition unit 112 transmits the terminal ID of the callee to the advertisement distribution server 2 (step S2). The call control server 1 transmits an INVITE message to the callee terminal 5-2 (step S3). In response to this, the callee terminal 5-2 transmits a Ringing message to the call control server 1 (step S4), and causes the speaker 61 to output the ringtone or generates vibration indicating an incoming call.

The user ID acquisition unit 211 of the advertisement distribution server 2 having received the terminal ID of the callee from the call control server 1 acquires the user ID stored in the identification information DB 24a in association with the terminal ID of the callee. Then, the advertisement content acquisition unit 212 transmits the acquired user ID to the DMP server 3 (step S5).

The advertisement content selection unit 312 of the DMP server 3 having received the user ID from the advertisement distribution server 2 selects the advertisement video content based on the user ID (step S6). For example, the advertisement content selection unit 312 acquires the user attribute information stored in the member attribute DB 34a in association with the user ID. Based on the user attribute information and the target condition information stored in the advertisement DB 34b, the advertisement content selection unit 312 calculates, for each advertisement video content, a similarity degree between the attribute of the callee and the attribute of the user to whom the advertisement is presented. The advertisement distribution server 2 selects advertisement video content from the advertisement DB 34b based on the calculated similarity degree (step S6). The advertisement content transmission unit 313 transmits the selected advertisement video content to the advertisement distribution server 2 (step S7).

The advertisement content acquisition unit 212 of the advertisement distribution server 2 having received the advertisement video content from the DMP server 3 extracts the sound data from the advertisement video content and generates the advertisement sound content (step S8). The advertisement content transmission unit 213 transmits the generated advertisement sound content to the call control server 1 (step S9).

The advertisement content transmission unit 113 of the call control server 1 having received the advertisement sound content from the advertisement distribution server 2 transmits the advertisement sound content to the caller terminal 5-1 (step S10).

The advertisement content presentation control unit 512 of the caller terminal 5-1 having received the advertisement sound content from the call control server 1 causes the advertisement sound to be output from the earpiece 60, the speaker 61, or the earphone 6 based on the advertisement sound content (step S11).

When the callee performs, with the callee terminal 5-2, an operation of answering the phone from the caller, the callee terminal 5-2 transmits an OK message to the call control server 1 (step S12). The call control server 1 having received the OK message transmits an OK message to the caller terminal 5-1 (step S13). The advertisement content presentation control unit 512 of the caller terminal 5-1 having received the OK message stops output of the advertisement sound and transmits an ACK message to the callee terminal 5-2 (step S14). Then, the caller terminal 5-1 and the callee terminal 5-2 are connected for a call (step S15).

As described above, according to the present embodiment, the telephone advertisement system SA acquires a terminal ID indicating a callee in response to receiving, from the caller terminal 5-1, a telephone talk request from the caller to the callee. The telephone advertisement system SA acquires the advertisement content associated with the target condition corresponding to the attribute of the callee among the plurality of pieces of advertisement content associated with the respective target conditions stored in the storage unit 34 of the DMP server 3, based on the acquired terminal ID. The telephone advertisement system SA transmits the acquired advertisement content to the caller terminal 5-1, thereby causing the caller terminal 5-1 to present the advertisement content within the invitation period during which the callee is being invited to answer an incoming call.

Therefore, the advertisement content for which the target condition of the person to whom the advertisement content is presented corresponds to the attribute of the callee is presented to the caller within the invitation period during which the callee is invited to answer an incoming call. Since the caller has made a call to the callee, it is presumed that the caller and the callee are in a relationship in which they talk together. Therefore, there may be some common attribute between the caller and the callee. The common attribute may be an attribute that has not been able to be identified from the behavior of the caller himself/herself or the situation surrounding the caller. Therefore, it is expected that the effect of the advertisement is enhanced by presenting the advertisement corresponding to the attribute of the callee to the caller. Therefore, it is possible to present an advertisement corresponding to an attribute of a user, which has been difficult to identify so far, at the time of inviting a callee to answer an incoming call in a situation where the user attempts to make the call.

Here, the telephone advertisement system SA may acquire the advertisement sound associated with the target condition corresponding to the attribute of the callee. The telephone advertisement system SA may transmit the acquired advertisement sound, thereby causing the caller terminal 5-1 to output the advertisement sound within the period of time in which the ring-back tone should be output.

In this case, it is possible to cause the caller to hear the advertisement sound instead of or together with the ringback tone.

Here, the telephone advertisement system SA may acquire the advertisement video with sound associated with the target condition corresponding to the attribute of the callee. The telephone advertisement system SA may acquire the advertisement sound by generating the advertisement sound based on the sound extracted from the acquired advertisement video.

In this case, the sound is extracted from the advertisement video with sound, and the advertisement sound is generated based on the extracted sound. This advertisement sound is presented to the caller. Therefore, since the advertisement sound is automatically generated, it is not necessary to prepare sound if a video available for the advertisement already exists.

2. Second Embodiment

Next, the second embodiment will be described with reference to FIGS. 14 and 15. The second embodiment may be the same as the first embodiment except for the points described below. In the present embodiment, an advertisement content based on both the attribute of the callee and the attribute of the caller is presented.

Specifically, the terminal ID acquisition unit 111 of the call control server 1 acquires a terminal ID indicating a callee and a terminal ID indicating a caller. For example, the caller terminal 5-1 may transmit a telephone talk request including the terminal ID of the caller to the call control server 1. Alternatively, the call control server 1 may acquire the terminal ID of the caller by transmitting the IP address of the caller terminal 5-1 to a predetermined location server that stores the IP address and the terminal ID in association with each other for each user terminal 5.

The advertisement content acquisition unit 112 transmits, to the advertisement distribution server 2, the terminal ID of each of the callee and the caller acquired by the terminal ID acquisition unit 111.

The user ID acquisition unit 211 of the advertisement distribution server 2 acquires the user ID associated with the terminal ID indicating the callee acquired from the call control server 1, and acquires the user ID associated with the terminal ID indicating the caller acquired from the call control server 1.

Based on the user ID indicating the callee and the user ID indicating the caller acquired by the user ID acquisition unit 211, the advertisement content acquisition unit 212 acquires the advertisement content associated with the target condition corresponding to the attribute not having an exclusive relationship with the attribute of the caller among the attributes of the callee. Specifically, the advertisement content acquisition unit 212 transmits the user ID of each of the callee and the caller to the DMP server 3.

The user ID acquisition unit 311 of the DMP server 3 acquires the user ID of each of the callee and the caller transmitted from the advertisement distribution server 2.

The advertisement content selection unit 312 selects advertisement content associated with a target condition corresponding to an attribute not having an exclusive relationship with the attribute of the caller indicated by the user ID acquired by the user ID acquisition unit 311 among the attributes of the callee indicated by the user ID acquired by the user ID acquisition unit 311. The attributes in an exclusive relationship refers to a relationship between a first attribute and another second attribute in which the same person cannot have the first attribute and the second attribute at the same time. The attributes not in an exclusive relationship refers to a relationship between a first attribute and another second attribute in which the same person can have the first attribute and the second attribute at the same time.

Figure 14:
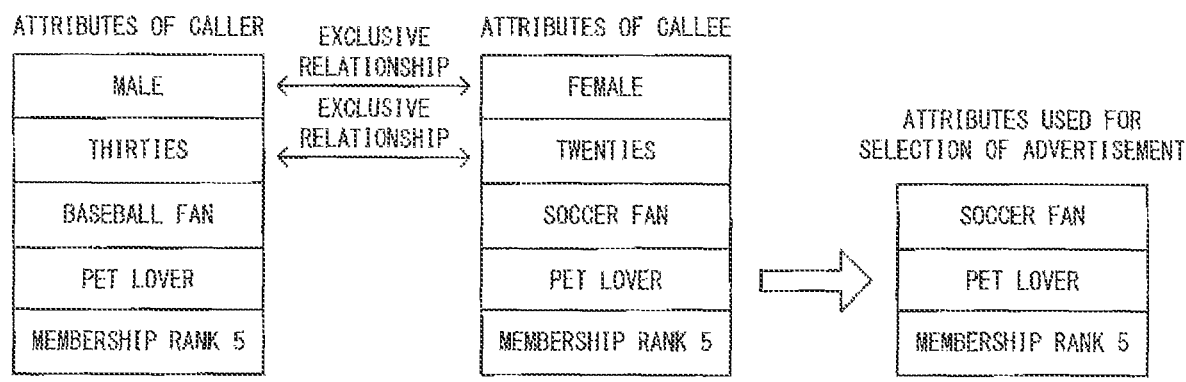
FIG. 14 is a view showing an example of determining an attribute to be used for selecting advertisement contents.

FIG. 14 is a view showing an example of determining an attribute to be used for selecting advertisement contents. As shown in FIG. 14, it is assumed that the callee has attributes of female, in her twenties, soccer fan, pet lover, and membership rank 5. Here, the soccer fan may mean, for example, purchasing soccer gears at a frequency equal to or more than a predetermined frequency in an online shopping mall. On the other hand, it is assumed that the caller has attributes of male, in his thirties, baseball fan, pet lover, and membership rank 5. Normally, there cannot be a state in which the same person is female and male. There cannot be a state in which the same person is in his/her twenties and thirties. Therefore, the attribute of female and the attribute of male are in an exclusive relationship, and the attribute of twenties and the attribute of thirties are also in an exclusive relationship. There can be a state in which the same person likes soccer and likes baseball. Therefore, these attributes are not in an exclusive relationship. The attributes of pet lover and membership rank 5 are common between the callee and the caller. Therefore, there is no attribute in an exclusive relationship for each of pet lover and the membership rank 5. As a result, the advertisement content selection unit 312 selects advertisement content associated with the target condition corresponding to the attributes of soccer fan, pet lover, and membership rank 5. Thus, the advertisement content acquisition unit 212 of the advertisement distribution server 2 and the advertisement content acquisition unit 112 of the call control server 1 acquire the advertisement content associated with the target condition corresponding to the attribute not in an exclusive relationship with the attribute of the caller among the attributes of the callee. Note that advertisement content selection unit 312 may select advertisement content associated with a target condition corresponding to, among the attributes of the callee, an attribute that is not in an exclusive relationship with the attribute of the caller and is not common between the callee and the caller. That is, the advertisement content may be selected based on only the attribute that has not been able to be identified from the previous behavior of the caller or the situation of the caller. With the attributes shown in FIG. 14 described as an example, advertisement content associated with the target condition corresponding to the attribute of soccer fan is acquired.

Figure 15:
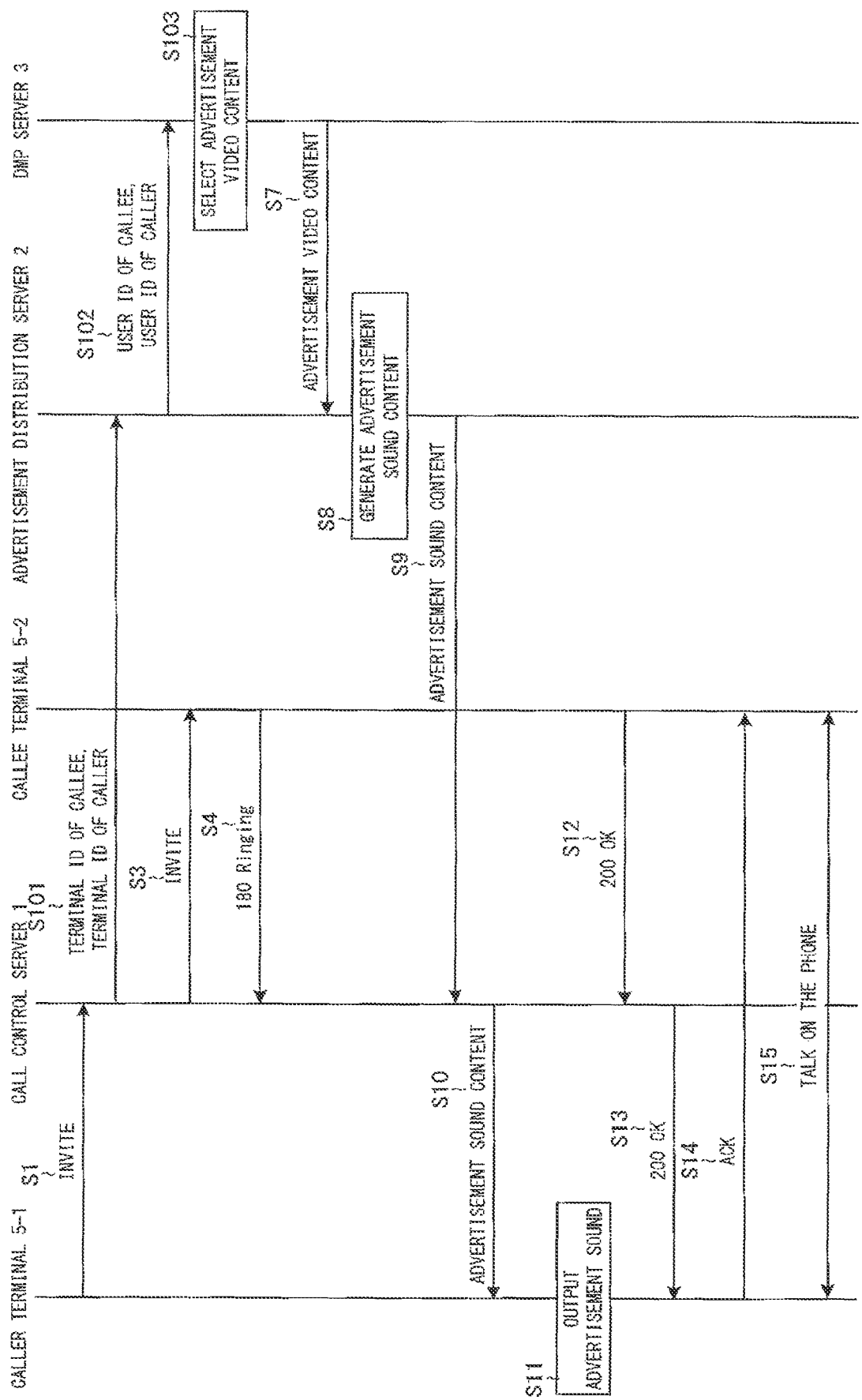
FIG. 15 is a sequence diagram showing an operation example of the information communication system S.

FIG. 15 is a sequence diagram showing an operation example of the information communication system S. In FIG. 15, the same steps as those in FIG. 13 are denoted by the same reference numerals. As shown in FIG. 15, the terminal ID acquisition unit 111 of the call control server 1 acquires the terminal ID of the callee and the terminal ID of the caller in response to receiving the INVITE message from the caller terminal 5-1. Then, the advertisement content acquisition unit 112 transmits the terminal ID of the callee and the terminal ID of the caller to the advertisement distribution server 2 (step S101). Steps S3 and S4 are executed between the call control server 1 and a callee terminal 5-2.

The user ID acquisition unit 211 of the advertisement distribution server 2 having received the terminal IDs from the call control server 1 acquires the user ID of the callee and the user ID of the caller from the identification information DB 24a. Then, the advertisement content acquisition unit 212 transmits the user ID of the callee and the user ID of the caller to the DMP server 3 (step S102).

The advertisement content selection unit 312 of the DMP server 3 having received the user IDs from the advertisement distribution server 2 acquires the user attribute information of the callee and the user attribute information of the caller from the member attribute DB 34a. Then, based on the acquired user attribute information, the advertisement content selection unit 312 acquires, from the advertisement DB 34b, advertisement video content associated with a target condition corresponding to an attribute not having an exclusive relationship with the attribute of the caller among the attributes of the callee (step S103). Thereafter, similarly to FIG. 13, steps S7 to S15 are executed.

As described above, according to the present embodiment, the advertisement content associated with the target condition corresponding to the attribute having in an exclusive relationship with the attribute of the caller among the attributes of the callee is presented to the caller. Therefore, the advertisement content according to the attribute of the callee is acquired with excluding the attribute that the caller cannot have. Therefore, it is possible to present advertisement content more suitable for the caller.

3. Third Embodiment

Figure 16:
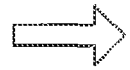
FIG. 16 is a view showing an example of determining an attribute to be used for selecting advertisement contents.

Next, the third embodiment will be described with reference to FIG. 16. The fourth embodiment may be the same as the second embodiment except for the points described below. In the present embodiment, advertisement content according to an attribute common to the callee and the caller is presented.

Specifically, the advertisement content selection unit 312 of the DMP server 3 selects the advertisement content associated with the target condition corresponding to a part common to the attributes of the callee indicated by the user ID acquired by user ID acquisition unit 311 and the attributes of the caller indicated by the user ID acquired by user ID acquisition unit 311. FIG. 16 is a view showing an example of determining an attribute to be used for selecting advertisement contents. The attribute of the callee and the attribute of the caller are the same between FIGS. 16 and 15. Therefore, the part common to the attribute of the callee and the attribute of the caller is pet lover and membership rank 5. Therefore, as shown in FIG. 16, the advertisement content selection unit 312 selects advertisement content associated with the target condition corresponding to the attributes of pet lover and membership rank 5. Thus, the advertisement content acquisition unit 212 of the advertisement distribution server 2 and the advertisement content acquisition unit 112 of the call control server 1 acquire the advertisement content associated with the target condition corresponding to the attribute common to the callee and the caller.

As described above, according to the present embodiment, the advertisement content associated with the target condition corresponding to the attribute common to the callee and the caller is presented to the caller. Therefore, it is possible to present advertisement content more suitable for the caller.

4. Fourth Embodiment

Next, the fourth embodiment will be described. The fourth embodiment may be the same as any of the embodiments described so far except for the points described below. In the present embodiment, the advertisement distribution server 2 acquires displayable advertisement content from the DMP server 3. Then, the advertisement distribution server 2 generates advertisement sound content based on the acquired advertisement content. The displayable advertisement content may be any one of advertisement video content, advertisement image content, and advertisement text content. The advertisement image content may be data of a still image indicating an advertisement, or may be a combination of data of a still image and text data indicating an advertisement. The advertisement text content is text data indicating an advertisement. The advertisement DB 34b of the DMP server 3 stores thereon the displayable advertisement content. That is, the advertiser registers video data, still image data, text data, or the like as the advertisement content.

The advertisement content acquisition unit 212 of the distribution server 2 acquires the displayable advertisement content that is the advertisement content associated with the target condition corresponding to the attribute of the callee based on the user ID acquired by the user ID acquisition unit 211. Specifically, the advertisement content acquisition unit 212 transmits the user ID to the DMP server 3. Then, the advertisement content acquisition unit 212 acquires the advertisement content transmitted from the DMP server 3 accordingly.

The advertisement content acquisition unit 212 acquires advertisement sound content by generating the advertisement sound content based on the character extracted from the advertisement content acquired from the DMP server 3. For example, the advertisement content acquisition unit 212 extracts characters from a still image or a video of advertisement content by using character recognition. When the advertisement content includes text data, the advertisement content acquisition unit 212 may directly extract characters from the text data. The advertisement content acquisition unit 212 may perform morphological analysis on the extracted character, and may extract a term of each item such as a sale item name, a sales floor name, a price, and a promotion name. The advertisement content acquisition unit 212 may generate sound data indicating a speech sound of each term. Then, the advertisement content acquisition unit 212 may generate advertisement sound content by combining the generated sound data in a way that is the same as the way described in the first embodiment.

As described above, according to the present embodiment, characters are extracted from displayable advertisement content, and advertisement sound is generated based on the extracted characters. This advertisement sound is presented to the caller. Therefore, since the advertisement sound is automatically generated, it is not necessary to prepare sound if content available for the advertisement already exists.

5. Fifth Embodiment

Next, the fifth embodiment will be described with reference to FIGS. 17 to 20. The fifth embodiment may be the same as any of the embodiments described so far except for the points described below. In the present embodiment, the advertisement distribution server 2 generates advertisement sound content having a length corresponding to the tendency of the time until the callee answers the phone.

Figure 17:
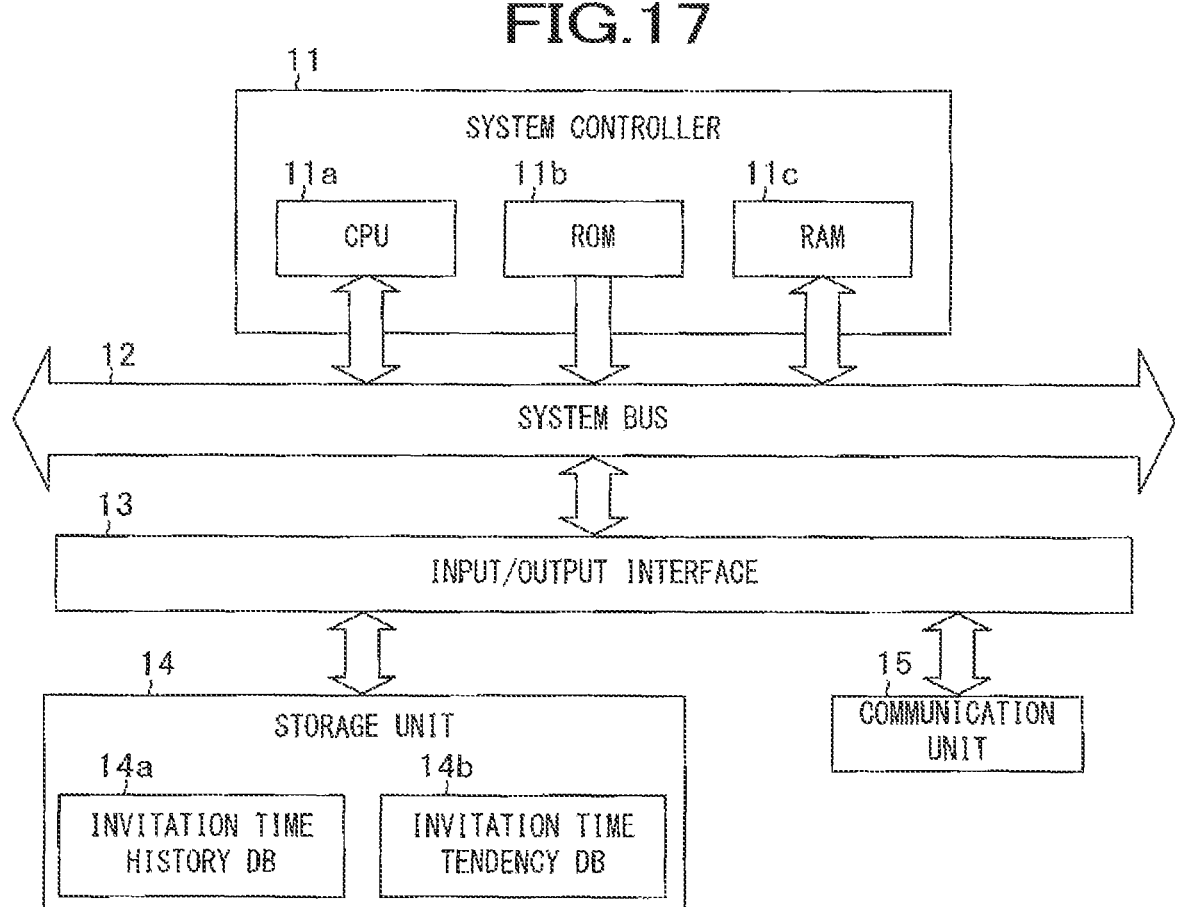
FIG. 17 is a block diagram showing an example of a schematic configuration of the call control server 1 according to an embodiment.

FIG. 17 is a block diagram showing an example of a schematic configuration of the call control server 1 according to an embodiment. In FIG. 17, the same elements as those in FIG. 2 are denoted by the same reference numerals. As shown in FIG. 17, an invitation time history DB 14a and an invitation time tendency DB 14*b* are stored in the storage unit 14 of the call control server 1.

FIG. 18 is a view showing an example of information stored in a database in the call control server 1. The invitation time history DB 14*a* stores a history of invitation times. The invitation time may be a length of an invitation period. That is, the invitation time may be a time elapsed from when the invitation for the callee terminal 5-2 is started until the callee performs an operation of answering the phone on the callee terminal 5-2. In the invitation time history DB 14*a*, a log of elapsed time may be stored every time a call is made. Specifically, the invitation time history DB 14*a* may store, as a log, information such as a callee terminal ID, an incoming call date and time, and an invitation time in association with each other. The callee terminal ID is a terminal ID of the callee terminal 5-2. That is, the callee terminal ID is a terminal ID of the user terminal 5 of the callee, who is the user to whom the call is made. The incoming call date and time is a date and time when the callee terminal 5-2 receives an incoming call. The invitation time tendency DB 14*b* stores, for each user, a tendency of an invitation time at a time when the user is called. For example, the invitation time tendency DB 14*b* stores the callee terminal ID and the invitation time tendency information in association with each other. The time tendency information indicates how long the invitation time is likely, when the user indicated by the callee terminal ID receives the phone call. For example, the call control server 1 may calculate the tendency of the invitation time for each user based on the history stored in the invitation time history DB 14*a*. For example, the call control server 1 may calculate a representative value of the invitation time as the tendency of the invitation time. Examples of the representative value include a mean value, a median value, and a predetermined percentile. The call control server 1 may update the time tendency information regarding the callee every time the callee receives a phone call or may periodically update the time tendency information regarding each user.

Based on the terminal ID of the callee acquired by the terminal ID acquisition unit 111, the advertisement content acquisition unit 112 of the call control server 1 acquires invitation time tendency information indicating the tendency of an invitation time at a time when the callee is called. Specifically, the advertisement content acquisition unit 112 acquires the invitation time tendency information stored in the invitation time tendency DB 14*b* in association with the terminal ID of the callee. The advertisement content acquisition unit 112 transmits the terminal ID of the callee and the invitation time tendency information to the advertisement distribution server 2.

The advertisement content acquisition unit 212 of the advertisement distribution server 2 generates advertisement sound content having a length of time corresponding to the tendency of the invitation time indicated by the invitation time tendency information acquired by the call control server 1. For example, the advertisement content acquisition unit 212 may generate advertisement sound content having a length equal to or shorter than the invitation time indicated by the invitation time tendency information. Alternatively, the advertisement content acquisition unit 212 may generate the advertisement sound content such that a difference between the invitation time indicated by the invitation time tendency information and the length of the generated advertisement content becomes less than a predetermined value. As described above, the advertisement content acquisition unit 212 generates the advertisement sound content by combining the sound data corresponding to each of the plurality of items. Therefore, the advertisement content acquisition unit 212 may adjust the length of the advertisement sound content by increasing or decreasing the number of items of sound data used for generating the advertisement sound content. For example, a priority rank may be determined in advance for each item. For example, the sale item name may be the first position, the sales floor name may be the second rank, the price may be the third rank, and the promotion name may be the fourth rank. The advertisement content acquisition unit 212 may generate advertisement sound content by preferentially using the sound data of the item having the high priority rank. FIG. 19 is a view showing a generation example of advertisement sound content. For example, advertisement sound content is generated based on sound data of a sale item name, a sales floor name, a price, and a promotion name extracted from advertisement video content, advertisement image content, or the like of a certain advertisement. In this case, as shown in FIG. 19, advertisement sound contents 410 to 440 can be generated. The advertisement sound content 410 includes sound data of a sale item name, a sales floor name, a price, and a promotion name. The advertisement sound content 410 is 20-second long. The advertisement sound content 420 includes sound data of a sale item name, a sales floor name, and a price. The advertisement sound content 420 is 14-second long. The advertisement sound content 430 includes sound data of a sale item name and a sales floor name. The advertisement sound content 430 is 8-second long. The advertisement sound content 440 includes sound data of a sale item name. The advertisement sound content 440 is 5-second long. For example, it is assumed that an 80 percentile is used as the invitation time tendency information. Therefore, in a case where the invitation time tendency information of a certain user indicates 20 seconds, it is assumed that the playback of the advertisement sound content of 20 seconds is completed within the invitation period 80 times out of 100 times of the user receiving the phone call. Therefore, if the invitation time indicated by the invitation time tendency information is 20 seconds or more, the advertisement content acquisition unit 212 may generate the advertisement sound content 410. If the invitation time indicated by the invitation time tendency information is 14 seconds or more and less than 20 seconds, the advertisement content acquisition unit 212 may generate the advertisement sound content 420. If the invitation time indicated by the invitation time tendency information is 8 seconds or more and less than 14 seconds, the advertisement content acquisition unit 212 may generate the advertisement sound content 430. If the invitation time indicated by the invitation time tendency information is less than 8 seconds, the advertisement content acquisition unit 212 may generate the advertisement sound content 440.

FIG. 20 is a sequence diagram showing an operation example of the information communication system S. In FIG. 20, the same steps as those in FIG. 13 are denoted by the same reference numerals. The terminal ID acquisition unit 111 of the call control server 1 acquires the terminal ID of the callee in response to receiving the INVITE message from the caller terminal 5-1 (step S1). The advertisement content acquisition unit 212 acquires the invitation time tendency information of the callee based on the acquired terminal ID of the callee. Then, the advertisement content acquisition unit 212 transmits the terminal ID of the callee and the invitation time tendency information to the advertisement distribution server 2 (step S201). Thereafter, similarly to FIG. 13, steps S3 to S7 are executed.

After step S7, the advertisement content acquisition unit 212 of the advertisement distribution server 2 generates the advertisement sound content based on the advertisement video content received from the DMP server 3 and the invitation time tendency information received from the call control server 1 (step S202). For example, the advertisement content acquisition unit 212 extracts sound data of each item from the advertisement video content and calculates the length of the sound data of each item. For example, the advertisement content acquisition unit 212 determines sound data of which items are to be combined such that the length of the advertisement sound content becomes equal to or less than the invitation time indicated by the invitation time tendency information. Then, the advertisement content acquisition unit 212 generates advertisement sound content by combining the sound data of the determined combination with each other. Thereafter, similarly to FIG. 13, steps S9 to S15 are executed.

After step S15, the system controller 11 of the call control server 1 calculates, as an invitation time, for example, a time from a time point at which the INVITE message is transmitted from the call control server 1 to the callee terminal 5-2 to a time point at which the OK message is transmitted from the callee terminal 5-2 to the call control server 1. The system controller 11 stores the calculated invitation time in the invitation time history DB 14a in association with the terminal ID of the callee. The system controller 11 acquires all the invitation times stored in the invitation time history DB 14a in association with the terminal ID of the callee. The system controller 11 generates invitation time tendency information by calculating a representative value of the acquired invitation time. The system controller 11 updates the invitation time tendency information stored in the invitation time tendency DB 14b in association with the terminal ID of the callee with the generated invitation time tendency information (step S203).

As described above, according to the present embodiment, advertisement sound having a length corresponding to the tendency of the time from when the callee terminal 5-1 receives a phone call to when the callee answers the phone call is generated. Therefore, it is possible to generate the advertisement sound having a high possibility of allowing the caller to hear the entire advertisement sound within the invitation period.

6. Sixth Embodiment

Next, the sixth embodiment will be described with reference to FIG. 21. The sixth embodiment may be the same as any of the first to third embodiments except for the points described below. In the present embodiment, the advertisement distribution server 2 acquires advertisement sound content from the DMP server 3. Therefore, the advertisement distribution server 2 does not need to generate advertisement sound content. The call control server 1 transmits the advertisement sound content acquired from the DMP server 3 to the caller terminal 5-1. Advertisement sound content is stored in advertisement DB 34b of the DMP server 3. That is, the advertiser registers sound data as the advertisement content.

FIG. 21 is a sequence diagram showing an operation example of the information communication system S. In FIG. 21, the same steps as those in FIG. 13 are denoted by the same reference numerals. As shown in FIG. 21, similarly to FIG. 13, steps S1 to S5 are executed. The advertisement content selection unit 312 of the DMP server 3 having received the user ID from the advertisement distribution server 2 acquires the user attribute information of the callee from the member attribute DB 34a. Then, the advertisement content selection unit 312 selects, from the advertisement DB 34b, advertisement sound content associated with the target condition corresponding to the attribute of the callee based on the acquired user attribute information (step S301). Next, the advertisement content transmission unit 313 transmits the acquired advertisement sound content to the advertisement distribution server 2 (step S302). The advertisement content transmission unit 213 of the advertisement distribution server 2 having received the advertisement sound content from the DMP server 3 transmits this advertisement sound content to the call control server 1 (step S9). Thereafter, similarly to FIG. 13, steps S9 to S15 are executed.

As described above, according to the present embodiment, the telephone advertisement system SA acquires the advertisement sound associated with the target condition corresponding to the attribute of the callee. The telephone advertisement system SA transmits the acquired advertisement sound, thereby causing the caller terminal 5-1 to output the advertisement sound within the period of time in which the ring-back tone should be output. Therefore, it is possible to cause the caller to hear the advertisement sound instead of or together with the ring-back tone.

7. Seventh Embodiment

Next, the seventh embodiment will be described with reference to FIG. 22. The seventh embodiment may be the same as any of the first to third embodiments except for the points described below. In the present embodiment, displayable advertisement content is transmitted to the caller terminal 5-1. Then, the caller terminal 5-1 displays the advertisement content on the display unit 57. The advertisement distribution server 2 does not need to generate any advertisement content. The advertisement DB 34b of the DMP server 3 stores displayable advertisement content. Each advertisement content stored in DMP server 3 may include a linked URL.

When the caller makes a call, it is probable that the caller puts his/her ear close to the caller terminal 5-1 during the invitation period in order to check whether or not the callee has answered the call with a ring-back tone or to prepare to listen to a voice of the callee. Therefore, even if an advertisement content is displayed on the screen of the caller terminal 5-1 in this situation, there is a probability that the user does not view the advertisement content. If the advertisement content is displayed every time even though the user does not view the advertisement content, the effect and efficiency of the advertisement are low. In addition, for example, in a case where an advertising rate is paid by CPM, the cost effectiveness of the advertisement is reduced for the advertiser.

Therefore, the advertisement content presentation control unit 512 of the caller terminal 5-1 may display the advertisement content on the display unit 57 within the invitation period if the telephone voice output mode is a mode of outputting the voice of the person on the other end of the line from an output device different from the earpiece 60, and may prevent the advertisement content from being displayed on the display unit 57 during the invitation period if the telephone voice output mode is the normal mode of outputting the voice of the person on the other end of the line from the earpiece 60. The output device different from the earpiece 60 may be, for example, an earphone 6 or a speaker 61. Therefore, the telephone voice output mode recognized as the mode of outputting the voice of the person on the other end of the line from the output device different from the earpiece 60 may be only the earphone mode or only the speaker mode. Alternatively, the telephone voice output mode recognized as the mode of outputting the voice of the person on the other end of the line from the output device different from the earpiece 60 may be both the earphone mode and the speaker mode.

The advertisement content presentation control unit 512 may determine whether or not the telephone voice output mode is the earphone mode based on, for example, whether or not the plug of the earphone 6 is connected to a connector 62. For example, the connector 62 may include a switch for detecting connection of the plug of the earphone 6. When the plug is connected to the connector 62, the switch is turned on. When the plug is not connected to the connector 62, the switch is turned off. The advertisement content presentation control unit 512 may determine whether or not the plug of the earphone 6 is connected to the connector 62 by monitoring the state of the switch. Alternatively, the voltage applied to a predetermined signal line among the signal lines connected to the connector 62 may change depending on the connection state of the plug of the earphone 6. For example, when the plug of the earphone 6 is connected to the connector 62, the voltage of the predetermined signal line becomes a predetermined voltage higher than 0. When the plug of the earphone 6 is not connected to the connector 62, the voltage of the predetermined signal line becomes 0. The advertisement content presentation control unit 512 may determine whether or not the plug of the earphone 6 is connected to the connector 62 by monitoring this voltage. Furthermore, the advertisement content presentation control unit 512 may determine whether or not the telephone voice output mode is the earphone mode based on whether or not the earphone 6 and a near-field wireless communication unit 56 are wirelessly connected. For example, the earphone 6 and the near-field wireless communication unit 56 perform communication according to a predetermined protocol or profile for sound transmission (for example, advanced sound distribution profile (A2DP)). Therefore, the advertisement content presentation control unit 512 may determine whether or not the device is the earphone 6 by determining whether or not any device and the near-field wireless communication unit 56 are wirelessly connected and determining whether or not the device and the near-field wireless communication unit 56 are connected by a predetermined protocol or profile. Furthermore, the advertisement content presentation control unit 512 may determine whether or not the telephone voice output mode is the speaker mode based on whether or not a button for setting the speaker mode displayed on the screen of the user terminal 5 is pressed by the caller.

The advertisement content is displayed only when the telephone voice output mode is the earphone mode or the speaker mode. In the earphone mode, the ring-back tone and the sound of the person on the other end of the line are output from the earphone. In the speaker mode, the ring-back tone and the sound of the person on the other end of the line are output from the speaker 61. Therefore, the caller can hear the ring-back tone and the sound of the person on the other end of the line without bringing his/her ear close to the caller terminal 5-1. Therefore, during invitation period, the caller may be able to view the advertisement displayed on the screen of the caller terminal 5-1. On the other hand, in the normal mode, the advertisement content is not displayed. Therefore, advertisement efficiency can be enhanced.

When the advertisement content is advertisement video content with sound, the advertisement content presentation control unit 512 may cause the sound included in the advertisement video content to be output from the earphone 6 or the speaker 61 according to the telephone voice output mode. At this time, the sound of the advertisement may be output instead of or together with the ring-back tone. When the advertisement content is content other than the advertisement video content with sound, the advertisement content presentation control unit 512 may display the advertisement content and output a ring-back tone.

FIG. 22 is a sequence diagram showing an operation example of the information communication system S. In FIG. 22, the same steps as those in FIG. 13 are denoted by the same reference numerals. FIG. 22 shows an example in a case where advertisement video content is presented as displayable advertisement content. The advertisement video content may or may not include sound. As shown in FIG. 22, similarly to FIG. 13, steps S1 to S7 are executed. The advertisement content transmission unit 213 of the advertisement distribution server 2 having received the advertisement video content from the DMP server 3 transmits this advertisement video content to the call control server 1 (step S401). The advertisement content transmission unit 113 of the call control server 1 having received the advertisement video content from the advertisement distribution server 2 transmits this advertisement video content to the caller terminal 5-1 (step S402).

The advertisement content presentation control unit 512 of the caller terminal 5-1 having received the advertisement video content from the call control server 1 determines whether or not the telephone voice output mode is the earphone mode or the speaker mode (step S403). If the telephone voice output mode is neither the earphone mode nor the speaker mode (step S403: NO), the advertisement content presentation control unit 512 does not play the advertisement video content and outputs a ring-back tone. On the other hand, if the telephone voice output mode is either the earphone mode or the speaker mode (step S403: YES), the advertisement content presentation control unit 512 plays the advertisement video content and causes the display unit 57 to display the video indicating the advertisement (step S404).

When the caller selects an advertisement content displayed on the screen, the advertisement content presentation control unit 512 may start the web browser. Then, the advertisement content presentation control unit 512 may acquire a sale item page of the advertised item for sale from an online shopping mall server 4 according to the linked URL embedded in the advertisement content, and cause the display unit 57 to display the sale item page.

When the callee performs, with the callee terminal 5-2, an operation of answering the phone from the caller, the callee terminal 5-2 transmits an OK message to the call control server 1 (step S12), and the call control server 1 transmits an OK message to the caller terminal 5-1 (step S13). Upon receiving the OK message, the caller terminal 5-1 stops playing the advertisement video content and transmits an ACK message to the callee terminal 5-2 (step S14). Then, the caller terminal 5-1 and the callee terminal 5-2 are connected for a call (step S15).

Note that the caller terminal 5-1 may periodically determine the telephone voice output mode during the invitation period. Then, the caller terminal 5-1 may start playing the advertisement video content after the telephone voice output mode is changed from the normal mode to the earphone mode or the speaker mode. Alternatively, the caller terminal 5-1 may determine the telephone voice output mode after the caller performs an operation of making a call before transmitting the INVITE message (step S1). Then, the caller terminal 5-1 may transmit, to the call control server 1, the INVITE message including the advertisement content request only when the telephone voice output mode is the earphone mode or the speaker mode. The call control server 1 may transmit displayable advertisement content to the caller terminal 5-1 only when the INVITE message from the caller terminal 5-1 includes a request for advertisement content.

As described above, according to the present embodiment, the telephone advertisement system SA acquires displayable advertisement content. The telephone advertisement system SA transmits the acquired advertisement content to the caller terminal 5-1, thereby causing the caller terminal 5-1 to display the advertisement content. Therefore, it is possible to show the advertisement to the caller within the invitation period during which the callee is being invited to answer an incoming call.

8. Eighth Embodiment

Next, the eighth embodiment will be described with reference to FIG. 23. The eighth embodiment may be the same as the sixth and seventh embodiments except for the points described below. In the present embodiment, the advertisement distribution server 2 acquires advertisement sound content or advertisement video content from the DMP server 3. The call control server 1 transmits, to the caller terminal 5-1, the advertisement sound content or the advertisement video content acquired from the DMP server 3. The advertisement distribution server 2 does not need to generate any advertisement content. The advertisement sound content or the advertisement video content is stored in the advertisement DB 34b of the DMP server 3.

The advertisement distribution server 2 acquires, from the DMP server 3, advertisement content having a length corresponding to the tendency of the time until the callee answers the phone. Therefore, as in the fifth embodiment, the storage unit 14 of the call control server 1 stores the invitation time history DB 14a and the invitation time tendency DB 14b shown in FIGS. 17 and 18.

Based on the terminal ID of the callee acquired by the terminal ID acquisition unit 111, the advertisement content acquisition unit 112 of the call control server 1 acquires invitation time tendency information indicating the tendency of an invitation time at a time when the callee is called. The advertisement content acquisition unit 112 transmits the terminal ID of the callee and the invitation time tendency information to the advertisement distribution server 2.

The advertisement content acquisition unit 212 of the advertisement distribution server 2 acquires the advertisement content having a length of time corresponding to the tendency of the invitation time indicated by the invitation time tendency information acquired from the call control server 1 among the pieces of advertisement content associated with the target condition corresponding to the attribute of the callee. Specifically, the advertisement content acquisition unit 212 transmits the user ID of the callee and the invitation time tendency information to the DMP server 3.

The advertisement content selection unit 312 of the DMP server 3 selects the advertisement content having the length of the time corresponding to the tendency of the invitation time from the advertisement content associated with the target condition corresponding to the attribute of the callee. For example, when calculating the similarity degree between the attribute of the callee and the attribute indicated by the target condition, the advertisement content selection unit 312 may calculate the similarity degree also in consideration of the difference between the invitation time of the callee indicated as the tendency and the length of the advertisement content. For example, the shorter the difference between the invitation time and the length of the advertisement content is, the higher similarity degree the advertisement content selection unit 312 may calculate. Therefore, the tendency of the invitation time is treated as one of the attributes of the callee. Alternatively, the advertisement content selection unit 312 may first extract a plurality of advertisement contents having a length of time corresponding to a tendency of the invitation time, calculate the similarity degree of attributes for each extracted advertisement content, and select the advertisement content having the highest similarity degree. For example, the advertisement content selection unit 312 may extract an advertisement content having the length equal to or less than an invitation time indicated by the invitation time tendency information. Alternatively, the advertisement content selection unit 312 may extract an advertisement content in which the difference between the invitation time indicated by the invitation time tendency information and the length of the advertisement content is less than a predetermined value.

FIG. 23 is a sequence diagram showing an operation example of the information communication system S. FIG. 23 shows an example of a case where advertisement sound content is provided as the advertisement content. In FIG. 23, the same steps as those in FIG. 13 are denoted by the same reference numerals. As shown in FIG. 23, the terminal ID acquisition unit 111 of the call control server 1 acquires the terminal ID of the callee in response to receiving the INVITE message from the caller terminal 5-1 (step S1). The advertisement content acquisition unit 212 acquires the invitation time tendency information of the callee based on the acquired terminal ID of the callee. Then, the advertisement content acquisition unit 212 transmits the terminal ID of the callee and the invitation time tendency information to the advertisement distribution server 2 (step S501). Steps S3 and S4 are executed between the call control server 1 and a callee terminal 5-2. The advertisement content acquisition unit 212 of the advertisement distribution server 2 having received the user ID of the callee and the invitation time tendency information from the call control server 1 acquires the user ID of the callee from the identification information DB 24a. The advertisement content acquisition unit 212 transmits the user ID of the callee and the invitation time tendency information to the DMP server 3 (step S S502). The advertisement content selection unit 312 of the DMP server 3 having received the user ID and the invitation time tendency information from the advertisement distribution server 2 acquires the user attribute information of the callee from the member attribute DB 34a. Then, based on the user attribute information and the invitation time tendency information, the advertisement content selection unit 312 selects, from the advertisement DB 34b, an advertisement sound content having a length of time corresponding to the tendency of the invitation time of the callee from among the pieces of advertisement content associated with the target condition corresponding to the attribute of the callee (step S503). The advertisement content transmission unit 313 transmits the selected advertisement sound content to the advertisement distribution server 2 (step S504). The advertisement content transmission unit 213 of the advertisement distribution server 2 having received the advertisement sound content from the DMP server 3 transmits this advertisement sound content to the call control server 1 (step S9). Thereafter, similarly to FIG. 21, steps S10 to S15 are executed. After step S15, the system controller 11 of the call control server 1 stores the invitation time in the invitation time history DB 14a in association with the terminal ID of the callee. The system controller 11 updates the invitation time tendency information stored in the invitation time tendency DB 14b in association with the terminal ID of the callee (step S505).

As described above, according to the present embodiment, the telephone advertisement system SA acquires the invitation time tendency information based on the terminal ID of the callee. The telephone advertisement system SA acquires advertisement content having a length of time corresponding to the tendency of the invitation time indicated by the acquired invitation time tendency information among the pieces of advertisement content associated with the target condition corresponding to the attribute of the callee. Therefore, among the plurality of pieces of the advertisement content, an advertisement video or an advertisement sound having a length corresponding to the tendency of the time from when the terminal device of the callee receives the phone call until the callee answers the phone call is presented to the caller. Therefore, it is possible to increase the possibility of allowing the caller to view or hear the entire advertisement content within the invitation period.

9. Ninth Embodiment

Next, the ninth embodiment will be described. The ninth embodiment may be the same as any of the embodiments described so far except for the points described below. The information communication system S may include a demand-side platform (DSP) and at least one supply-side platform (SSP). The information communication system S may or may not include the online shopping mall server 4. The DMP server 3 may also serve as a DSP. The storage unit 34 of the DMP server 3 may not store the advertisement DB 34b. Each SSP stores advertisement content registered by various advertisers and target condition information in association with each other. The advertiser is not limited to a store opening an online shopping mall. For example, a business operator who provides an item for sale or a service on a website run by the business operator itself may become an advertiser.

Upon acquiring the user ID of the callee from the advertisement distribution server 2, the DMP server 3 transmits the user attribute information of the callee to the DSP. The DSP transmits the user attribute information to each SSP. Each SSP determines, based on the user attribute information, one or a plurality of advertisement contents associated with the target condition corresponding to the attribute of the callee. The DSP determines which advertisement content among the pieces of advertisement content determined by SSP to distribute, by executing real-time bidding, for example. The DSP causes the determined advertisement content to be transmitted from SSP storing the advertisement content to the DMP server 3. The DMP server 3 transmits the advertisement content acquired from SSP to the advertisement distribution server 2.

The invention claimed is:

1. A telephone advertisement system comprising:
at least one memory configured to store thereon computer program code; and
at least one processor configured to access the at least one memory and operate according to the computer program code, the computer program code comprising:
an information acquisition code configured to cause at least one of the at least one processor to acquire, in response to receiving a telephone talk request from a caller to a callee, callee information indicating the callee from a caller terminal device of the caller;
an advertisement content acquisition code configured to cause at least one of the at least one processor to acquire, based on the acquired callee information, advertisement content associated with a condition corresponding to an attribute of the callee among a plurality of pieces of advertisement content, each of the plurality of pieces of advertisement content being associated with a condition of a person to whom respective advertisement content is presented, the condition of the person being stored in a predetermined storage; and
a transmission code configured to cause at least one of the at least one processor to transmit the acquired advertisement content to the caller terminal device and thereby cause the caller terminal device to present the advertisement content within an invitation period during which the callee is being invited to answer an incoming call,
wherein the computer program code further comprises a tendency information acquisition code configured to cause at least one of the at least one processor to acquire, based on the acquired callee information, tendency information indicating a tendency of an invitation time, the tendency being obtained from a history, for the callee, of a length of time that elapsed from when an invitation for the incoming call is started on a callee terminal device of the callee until an operation of answering the incoming call is performed on the callee terminal device of the callee, and
wherein the advertisement content acquisition code is configured to cause at least one of the at least one processor to present the advertisement content having a length of time that corresponds to the tendency of the invitation time indicated by the acquired tendency information.

2. The telephone advertisement system according to claim 1, wherein
the information acquisition code is configured to cause at least one of the at least one processor to acquire the callee information and caller information indicating the caller, and
the advertisement content acquisition code is configured to cause at least one of the at least one processor to acquire, based on the acquired callee information and caller information, advertisement content associated with the condition corresponding to the attribute not having an exclusive relationship with an attribute of the caller among attributes of the callee.

3. The telephone advertisement system according to claim 1, wherein
the information acquisition code is configured to cause at least one of the at least one processor to acquire the callee information and caller information indicating the caller, and
the advertisement content acquisition code is configured to cause at least one of the at least one processor to acquire, based on the acquired callee information and caller information, advertisement content associated with the condition corresponding to the attribute common to the callee and the caller.

4. The telephone advertisement system according to claim 1, wherein
the advertisement content acquisition code is configured to cause at least one of the at least one processor to acquire, as the advertisement content, an advertisement sound associated with the condition corresponding to the attribute of the callee, and
the transmission code is configured to cause at least one of the at least one processor to transmit the acquired advertisement sound and thereby causes the caller terminal device to output the advertisement sound within, as the invitation period, a period during which a ring-back tone should be output.

5. The telephone advertisement system according to claim 4, wherein the advertisement content acquisition code is configured to cause at least one of the at least one processor to acquire an advertisement video with sound associated with the condition corresponding to the attribute of the callee, generate the advertisement sound based on a sound extracted from the acquired advertisement video, and thereby acquire the advertisement sound.

6. The telephone advertisement system according to claim 5 wherein
the advertisement content acquisition code is configured to cause at least one of the at least one processor to generate the advertisement sound having a length of time that corresponds to the tendency of the invitation time indicated by the acquired tendency information.

7. The telephone advertisement system according to claim 4, wherein the advertisement content acquisition code is configured to cause at least one of the at least one processor to acquire displayable advertisement content associated with the condition corresponding to the attribute of the callee, generate the advertisement sound based on characters extracted from the acquired displayable advertisement content, and thereby acquire the advertisement sound.

8. The telephone advertisement system according to claim 7, wherein
the advertisement content acquisition code is configured to cause at least one of the at least one processor to generate the advertisement sound having a length of time that corresponds to the tendency of the invitation time indicated by the acquired tendency information.

9. The telephone advertisement system according to claim 1, wherein
at least one piece of the plurality of pieces of advertisement content includes at least any one of a sound and a video,
the advertisement content acquisition code is configured to cause at least one of the at least one processor to acquire the advertisement content having a length of time that corresponds to the tendency of the invitation time indicated by the acquired tendency information among pieces of advertisement content associated with the condition corresponding to the attribute of the callee.

10. The telephone advertisement system according to claim 1, wherein the tendency of the invitation time indicated by the acquired tendency information includes a value corresponding to a mean value, a median value, or a predetermined percentile of values of historical invitation times of the callee.

11. The telephone advertisement system according to claim 1, wherein the advertisement content acquisition code is configured to cause at least one of the at least one processor to generate an advertisement sound content by combining two or more sound data corresponding to each of a plurality of items included in the acquired advertisement content, and
wherein the advertisement content acquisition code is configured to cause at least one of the at least one processor to adjust a length of the advertisement sound content by increasing or decreasing a number of sound data to be combined among the plurality of items to generate the advertisement sound content.

12. A telephone advertisement method performable by a computer, the method comprising:
acquiring, in response to receiving a telephone talk request from a caller to a callee, callee information indicating the callee from a caller terminal device of the caller;
acquiring, based on the acquired callee information, advertisement content associated with a condition corresponding to an attribute of the callee among a plurality of pieces of advertisement content, each of the plurality of pieces of advertisement content being associated with a condition of a person to whom respective advertisement content is presented, the condition of the person being stored in a predetermined storage; and
transmitting the acquired advertisement content to the caller terminal device and thereby cause the caller terminal device to present the advertisement content within an invitation period during which the callee is being invited to answer an incoming call,
wherein the method further comprises acquiring, based on the acquired callee information, tendency information indicating a tendency of an invitation time, the tendency being obtained from a history, for the callee, of a length of time that elapsed from when an invitation for the incoming call is started on a callee terminal device of the callee until an operation of answering the incoming call is performed on the callee terminal device of the callee, and
wherein the acquired advertisement content has a length of time that corresponds to the tendency of the invitation time indicated by the acquired tendency information.

13. A non-transitory computer readable medium storing thereon a telephone advertisement program, the telephone advertisement program causing a computer to:
acquire, in response to receiving a telephone talk request from a caller to a callee, callee information indicating the callee from a caller terminal device of the caller;
acquire, based on the acquired callee information, advertisement content associated with a condition corresponding to an attribute of the callee among a plurality of pieces of advertisement content, each of the plurality of pieces of advertisement content being associated with a condition of a person to whom respective advertisement content is presented, the condition of the person being stored in a predetermined storage; and
transmit the acquired advertisement content to the caller terminal device and thereby cause the caller terminal device to present the advertisement content within an invitation period during which the callee is being invited to answer an incoming call,
wherein the telephone advertisement program further causes the computer to:
acquire, based on the acquired callee information, tendency information indicating a tendency of an invitation time, the tendency being obtained from a history, for the callee, of a length of time that elapsed from when an invitation for the incoming call is started on a callee terminal device of the callee until an operation of answering the incoming call is performed on the callee terminal device of the callee, and present the advertisement content having a length of time that corresponds to the tendency of the invitation time indicated by the acquired tendency information.

\* \* \* \* \*